(12) United States Patent
Shapiro et al.

(10) Patent No.: US 11,698,622 B2
(45) Date of Patent: Jul. 11, 2023

(54) PREVIEWS FOR COMPUTER NUMERICALLY CONTROLLED FABRICATION

(71) Applicant: Glowforge Inc., Seattle, WA (US)

(72) Inventors: Daniel Shapiro, Mercer Island, WA (US); Mark Gosselin, Seattle, WA (US); Bonny P. Lau, Seattle, WA (US); Jonathan Daniel Park, Seattle, WA (US); Malous Kossarian, New York, NY (US)

(73) Assignee: Glowforge Inc., Seattle, WA (US)

( * ) Notice: Subject to any disclaimer, the term of this patent is extended or adjusted under 35 U.S.C. 154(b) by 109 days.

(21) Appl. No.: 17/196,906

(22) Filed: Mar. 9, 2021

(65) Prior Publication Data

US 2022/0291664 A1    Sep. 15, 2022

(51) Int. Cl.
*G05B 19/4093*    (2006.01)
*G05B 19/4068*    (2006.01)
*G05B 19/4155*    (2006.01)

(52) U.S. Cl.
CPC ............ *G05B 19/40933* (2013.01); *G05B 19/4068* (2013.01); *G05B 19/4155* (2013.01)

(58) Field of Classification Search
None
See application file for complete search history.

(56) References Cited

U.S. PATENT DOCUMENTS

| | | |
|---|---|---|
| 3,721,811 A | 3/1973 | Taylor et al. |
| 3,967,176 A | 6/1976 | Wagener et al. |
| 4,055,787 A | 10/1977 | Beadle et al. |
| 4,138,718 A | 2/1979 | Toke et al. |

(Continued)

FOREIGN PATENT DOCUMENTS

| | | |
|---|---|---|
| CN | 101095033 A | 12/2007 |
| CN | 101733558 A | 6/2010 |

(Continued)

OTHER PUBLICATIONS

Dazhong Wu et al. "Cloud Manufacturing: Drivers, Current Status, and Future Trends." vol. 2. Systems; Micro And Nano Technologies Sustainable Manufacturing. Jun. 10, 2013. Retrieved on May 10, 2016. pp. 1-10.

(Continued)

*Primary Examiner* — Ryan A Jarrett
(74) *Attorney, Agent, or Firm* — Lee Sullivan Shea & Smith LLP

(57) ABSTRACT

A method for computer numerically controlled processing may include generating a user interface to enable the configuration of an edge treatment. The user interface may also be generated to enable the configuration of a design corresponding to a combination of the first object and the second object generated by applying one of a plurality of Boolean operation. A computer numerically controlled machine may be configured to deliver an electromagnetic energy in order to effect, in a material, one or more changes corresponding to the edge treatment and/or the design configured by the user. For example, the one or more changes corresponding to the edge treatment may include a variable depth engraving along at least a portion of a perimeter of a material.

20 Claims, 20 Drawing Sheets

(56) References Cited

U.S. PATENT DOCUMENTS

| | | |
|---|---|---|
| 4,383,762 A | 5/1983 | Burkert |
| 4,650,287 A | 3/1987 | Kudo et al. |
| 4,723,219 A | 2/1988 | Beyer et al. |
| 4,863,538 A | 9/1989 | Deckard |
| 4,894,831 A | 1/1990 | Alfrey |
| 4,901,359 A | 2/1990 | Bruder |
| 4,918,611 A | 4/1990 | Shyu et al. |
| 5,298,843 A | 3/1994 | Miyajima et al. |
| 5,355,250 A | 10/1994 | Grasso et al. |
| 5,396,279 A | 3/1995 | Vossen |
| 5,475,521 A | 12/1995 | Heidemann |
| 5,682,319 A | 10/1997 | Boland et al. |
| 5,756,961 A | 5/1998 | Sato et al. |
| 6,031,200 A | 2/2000 | Whitehouse |
| 6,085,122 A | 7/2000 | Manning |
| 6,087,625 A | 7/2000 | Iso |
| 6,284,999 B1 | 9/2001 | Virtanen et al. |
| 6,420,674 B1 | 7/2002 | Cole, III et al. |
| 6,420,675 B1 | 7/2002 | Lizotte et al. |
| 6,498,653 B1 | 12/2002 | Wang |
| 6,528,758 B2 | 3/2003 | Shaffer |
| 6,609,044 B1 | 8/2003 | Basista et al. |
| 6,628,322 B1 | 9/2003 | Cerruti |
| 6,696,667 B1 | 2/2004 | Flanagan |
| 7,005,606 B2 | 2/2006 | Legge et al. |
| 7,456,372 B2 | 11/2008 | Hiramatsu |
| 8,111,904 B2 | 2/2012 | Wallack et al. |
| 8,136,432 B2 | 3/2012 | Travez et al. |
| 8,786,928 B2 | 7/2014 | Dolleris et al. |
| 8,809,780 B2 | 8/2014 | Wollenhaupt et al. |
| 8,921,734 B2 | 12/2014 | Yerazunis et al. |
| 9,020,628 B2 | 4/2015 | Fagan |
| 9,235,205 B2 | 1/2016 | Prestidge et al. |
| 9,469,338 B2 | 10/2016 | Norberg Ohlsson |
| 9,618,926 B1 | 4/2017 | Louette et al. |
| 9,734,419 B1 | 8/2017 | Ye et al. |
| 9,782,906 B1 | 10/2017 | Aminpour et al. |
| 9,912,915 B2 | 3/2018 | Sinclair |
| 9,987,798 B2 | 6/2018 | Tyler |
| 10,234,260 B2 | 3/2019 | Siercks et al. |
| 10,379,517 B2 | 8/2019 | Shapiro et al. |
| 10,496,070 B2 | 12/2019 | Shapiro et al. |
| 10,509,390 B2 | 12/2019 | Shapiro et al. |
| 10,551,824 B2 | 2/2020 | Shapiro et al. |
| 10,642,251 B2 | 5/2020 | Platts et al. |
| 10,737,355 B2 | 8/2020 | Shapiro et al. |
| 10,802,465 B2 | 10/2020 | Shapiro et al. |
| 10,898,970 B2 | 1/2021 | Ishiguro et al. |
| 10,919,111 B2 | 2/2021 | Rubens et al. |
| 10,942,327 B2 | 3/2021 | Okubo |
| 2001/0012973 A1 | 8/2001 | Wehrli et al. |
| 2002/0129485 A1 | 9/2002 | Mok et al. |
| 2002/0144987 A1 | 10/2002 | Tomlinson et al. |
| 2003/0049373 A1 | 3/2003 | Van De Rijdt et al. |
| 2004/0029493 A1 | 2/2004 | Tricard et al. |
| 2004/0207831 A1 | 10/2004 | Aoyama |
| 2004/0223165 A1 | 11/2004 | Kurokawa et al. |
| 2004/0245227 A1 | 12/2004 | Grafton-Reed et al. |
| 2005/0051523 A1 | 3/2005 | Legge et al. |
| 2005/0069682 A1 | 3/2005 | Tseng |
| 2005/0071020 A1 | 3/2005 | Yamazaki et al. |
| 2005/0115941 A1 | 6/2005 | Sukhman et al. |
| 2005/0142701 A1 | 6/2005 | Yamaguchi et al. |
| 2005/0187651 A1 | 8/2005 | Kimura et al. |
| 2006/0043615 A1 | 3/2006 | Zheng et al. |
| 2007/0000889 A1 | 1/2007 | Yamazaki et al. |
| 2007/0032733 A1 | 2/2007 | Burton |
| 2007/0034615 A1 | 2/2007 | Kleine |
| 2008/0058734 A1 | 3/2008 | Hanft et al. |
| 2008/0100829 A1 | 5/2008 | Watson |
| 2008/0101687 A1 | 5/2008 | Goeller |
| 2008/0149604 A1 | 6/2008 | Varriano-Marston et al. |
| 2008/0160254 A1 | 7/2008 | Arnold |
| 2008/0243299 A1 | 10/2008 | Johnson et al. |
| 2008/0249653 A1 | 10/2008 | Ichikawa |
| 2009/0120914 A1 | 5/2009 | Lawrence |
| 2009/0250445 A1 | 10/2009 | Yamaguchi et al. |
| 2009/0308851 A1 | 12/2009 | Harnisch et al. |
| 2010/0063603 A1 | 3/2010 | Chandhoke |
| 2010/0081971 A1 | 4/2010 | Allison |
| 2010/0149337 A1 | 6/2010 | Porcino |
| 2010/0193482 A1 | 8/2010 | Ow et al. |
| 2010/0193483 A1 | 8/2010 | Chen et al. |
| 2010/0274379 A1 | 10/2010 | Hehl |
| 2010/0292947 A1 | 11/2010 | Buk |
| 2010/0301023 A1 | 12/2010 | Unrath et al. |
| 2010/0326962 A1 | 12/2010 | Calla et al. |
| 2011/0005458 A1 | 1/2011 | Cunningham |
| 2011/0080476 A1 | 4/2011 | Dinauer et al. |
| 2011/0127333 A1 | 6/2011 | Veksland et al. |
| 2011/0135208 A1 | 6/2011 | Atanassov et al. |
| 2011/0193943 A1 | 8/2011 | Campbell |
| 2011/0286007 A1 | 11/2011 | Pangrazio et al. |
| 2011/0316977 A1 | 12/2011 | Pienaar |
| 2012/0035745 A1 | 2/2012 | Mori et al. |
| 2012/0117787 A1 | 5/2012 | Sun et al. |
| 2012/0120232 A1 | 5/2012 | Nishikawa |
| 2012/0197427 A1 | 8/2012 | Gallucci et al. |
| 2012/0293821 A1 | 11/2012 | Chiba |
| 2013/0158957 A1 | 6/2013 | Lee et al. |
| 2013/0178972 A1 | 7/2013 | Goldsmith et al. |
| 2013/0190898 A1 | 7/2013 | Shilpiekandula et al. |
| 2013/0200053 A1 | 8/2013 | Bordatchev |
| 2013/0211391 A1 | 8/2013 | BenYakar et al. |
| 2013/0304248 A1 | 11/2013 | Lange et al. |
| 2014/0005804 A1 | 1/2014 | Brand |
| 2014/0018779 A1 | 1/2014 | Worrell et al. |
| 2014/0039707 A1 | 2/2014 | Curtis et al. |
| 2014/0046131 A1 | 2/2014 | Morita et al. |
| 2014/0071330 A1 | 3/2014 | Zhang et al. |
| 2014/0071502 A1 | 3/2014 | Liu |
| 2014/0160273 A1 | 6/2014 | Jedynak et al. |
| 2014/0268607 A1 | 9/2014 | Wicker et al. |
| 2014/0299586 A1 | 10/2014 | Sawabe et al. |
| 2014/0310122 A1 | 10/2014 | Danielson et al. |
| 2014/0330424 A1 | 11/2014 | Garaas et al. |
| 2014/0371895 A1 | 12/2014 | Sadusk et al. |
| 2015/0030821 A1 | 1/2015 | Costin, Sr. et al. |
| 2015/0107033 A1 | 4/2015 | Chang et al. |
| 2015/0108095 A1 | 4/2015 | Kruer et al. |
| 2015/0112470 A1 | 4/2015 | Chang et al. |
| 2015/0136949 A1 | 5/2015 | De Nooij et al. |
| 2015/0154453 A1 | 6/2015 | Wilf |
| 2015/0158121 A1 | 6/2015 | Di Cairano et al. |
| 2015/0158311 A1 | 6/2015 | Ogasawara et al. |
| 2015/0197064 A1 | 7/2015 | Walker et al. |
| 2015/0212421 A1 | 7/2015 | deVilliers et al. |
| 2015/0228069 A1 | 8/2015 | Fresquet et al. |
| 2015/0245549 A1 | 8/2015 | Kurita et al. |
| 2015/0301327 A1 | 10/2015 | Okugawa et al. |
| 2015/0355621 A1 | 12/2015 | Ikeda et al. |
| 2015/0360318 A1 | 12/2015 | Aubry |
| 2015/0378348 A1 | 12/2015 | Gupta et al. |
| 2016/0059371 A1 | 3/2016 | Chang et al. |
| 2016/0084649 A1 | 3/2016 | Yamazaki et al. |
| 2016/0093540 A1 | 3/2016 | LIU et al. |
| 2016/0147213 A1 | 5/2016 | Murakami |
| 2016/0156771 A1 | 6/2016 | Lee |
| 2016/0199945 A1 | 7/2016 | McDowell et al. |
| 2016/0210737 A1 | 7/2016 | Straub et al. |
| 2016/0271718 A1 | 9/2016 | Fagan |
| 2016/0303845 A1 | 10/2016 | Arce |
| 2016/0325541 A1 | 11/2016 | Lavrentyev et al. |
| 2016/0349038 A1 | 12/2016 | Ohtsuka et al. |
| 2016/0360409 A1 | 12/2016 | Singh |
| 2016/0372349 A1 | 12/2016 | Hyakumura |
| 2017/0008127 A1 | 1/2017 | Hyatt et al. |
| 2017/0045877 A1 | 2/2017 | Shapiro et al. |
| 2017/0045879 A1 | 2/2017 | Yang et al. |
| 2017/0057008 A1 | 3/2017 | LIU et al. |
| 2017/0123362 A1 | 5/2017 | Masui et al. |
| 2017/0203390 A1 | 7/2017 | Kato |
| 2017/0235293 A1 | 8/2017 | Shapiro et al. |
| 2017/0235294 A1 | 8/2017 | Shapiro et al. |

(56) References Cited

U.S. PATENT DOCUMENTS

| | | |
|---|---|---|
| 2017/0243374 A1 | 8/2017 | Matsuzawa |
| 2017/0341183 A1 | 11/2017 | Buller et al. |
| 2018/0001565 A1 | 1/2018 | Hocker |
| 2018/0113434 A1 | 4/2018 | Shapiro et al. |
| 2018/0147657 A1 | 5/2018 | Shapiro |
| 2018/0147659 A1 | 5/2018 | Shapiro |
| 2018/0150047 A1 | 5/2018 | Shapiro |
| 2018/0150062 A1 | 5/2018 | Shapiro |
| 2019/0014307 A1 | 1/2019 | McNamer et al. |
| 2019/0058870 A1 | 2/2019 | Rowell et al. |
| 2019/0148028 A1 | 5/2019 | Ravenhall et al. |
| 2019/0278250 A1 | 9/2019 | Clement et al. |
| 2019/0310604 A1 | 10/2019 | Shapiro et al. |
| 2020/0004225 A1* | 1/2020 | Buller .................. B29C 64/393 |
| 2020/0039002 A1 | 2/2020 | Sercel et al. |
| 2020/0056938 A1 | 2/2020 | Barkhurst et al. |
| 2020/0064806 A1 | 2/2020 | Shapiro et al. |
| 2020/0073362 A1 | 3/2020 | Shapiro et al. |
| 2020/0089184 A1 | 3/2020 | Shapiro et al. |
| 2020/0089185 A1 | 3/2020 | Shapiro et al. |
| 2020/0125071 A1 | 4/2020 | Shapiro et al. |
| 2020/0192332 A1 | 6/2020 | Jacobs et al. |
| 2020/0398457 A1 | 12/2020 | Zhang et al. |
| 2021/0075180 A1 | 3/2021 | Hudek |
| 2021/0094127 A1 | 4/2021 | Sercel et al. |

FOREIGN PATENT DOCUMENTS

| | | |
|---|---|---|
| CN | 101837517 A | 9/2010 |
| CN | 205958834 U | 2/2017 |
| CN | 106670656 A | 5/2017 |
| DE | 10 2014 214058 A1 | 1/2016 |
| EP | 0 954 125 A2 | 11/1999 |
| EP | 1 309 108 A1 | 5/2003 |
| EP | 2 471 625 A2 | 7/2012 |
| EP | 2 808 123 A1 | 12/2014 |
| FR | 2748562 A1 | 11/1997 |
| JP | H03-254380 A | 11/1991 |
| JP | 04-244347 A | 9/1992 |
| JP | H05-205051 A | 8/1993 |
| JP | 2001-330413 A | 11/2001 |
| JP | 2002-123306 A | 4/2002 |
| JP | 2006-329751 A | 12/2006 |
| JP | 2008-119718 A | 5/2008 |
| WO | WO-94/03302 A1 | 2/1994 |
| WO | WO-96/23240 A1 | 8/1996 |
| WO | WO-01/076250 A1 | 10/2001 |
| WO | WO-2016/131019 A1 | 8/2016 |
| WO | WO-2016/131022 A1 | 8/2016 |

OTHER PUBLICATIONS

Examination Report issued in European Patent Application No. 16709185.9, dated Jul. 1, 2020 (Jul. 1, 2020). 5 pages.
First Office Action issued in Chinese Patent Application No. 201680021337.8, dated Apr. 10, 2019. 6 pages. [Chinese language].
First Office Action issued in Chinese Patent Application No. 201680021337.8, dated Apr. 10, 2019. 8 pages. [English language translation].
Gao, Rong et al. "Human-Machine Collaborative Workshop Digital Manufacturing." *ICICTA. 2010 IEEE.* May 11, 2010. pp. 445-448.
Inmagine Group. Vectr Free Online Vector Graphics Software. Retrieved Mar. 22, 2021, from https://vectr.com/. 3 pages.
International Search Report and Written Opinion issued in International Application No. PCT/US2016/017900, dated May 27, 2016. 16 pages.
International Search Report and Written Opinion issued in International Application No. PCT/US2016/017901, dated Jun. 3, 2016 (Jun. 3, 2016). 13 pages.
International Search Report and Written Opinion issued in International Application No. PCT/US2016/017903, dated Jun. 1, 2016. 15 pages.
International Search Report and Written Opinion issued in International Application No. PCT/US2016/017904, dated May 23, 2016. (May 23, 2016). 19 pages.
International Search Report and Written Opinion issued in International Application No. PCT/US2017/063187, dated Apr. 3, 2018 (Apr. 3, 2018). 11 pages.
International Search Report and Written Opinion issued in International Application No. PCT/US2017/063188, dated Feb. 16, 2018 (Feb. 16, 2018). 14 pages.
International Search Report and Written Opinion issued in International Application No. PCT/US2017/063189, dated May 2, 2018 (May 2, 2018). 22 pages.
International Search Report and Written Opinion issued in International Application No. PCT/US2017/063190, dated May 3, 2018 (May 3, 2018). 18 pages.
International Search Report and Written Opinion issued in International Application No. PCT/US2017/063191, dated Mar. 21, 2018 (Mar. 21, 2018). 12 pages.
International Search Report and Written Opinion issued in International Application No. PCT/US2017/063192, dated Apr. 19, 2018 (Apr. 19, 2018). 12 pages.
International Search Report and Written Opinion issued in International Application No. PCT/US2017/063193, dated Feb. 16, 2018 (Feb. 16, 2018). 12 pages.
Second Office Action issued in Chinese Patent Application No. 201680021337.8, dated Nov. 4, 2019. 3 pages. [Chinese language].
Second Office Action issued in Chinese Patent Application No. 201680021337.8, dated Nov. 4, 2019. 4 pages. [English language translation].
Third Office Action issued in Chinese Patent Application No. 201680021337.8, dated Jul. 23, 2020. 11 pages. [Chinese language].
Third Office Action issued in Chinese Patent Application No. 201680021337.8, dated Jul. 23, 2020. 20 pages. [English language translation].

* cited by examiner

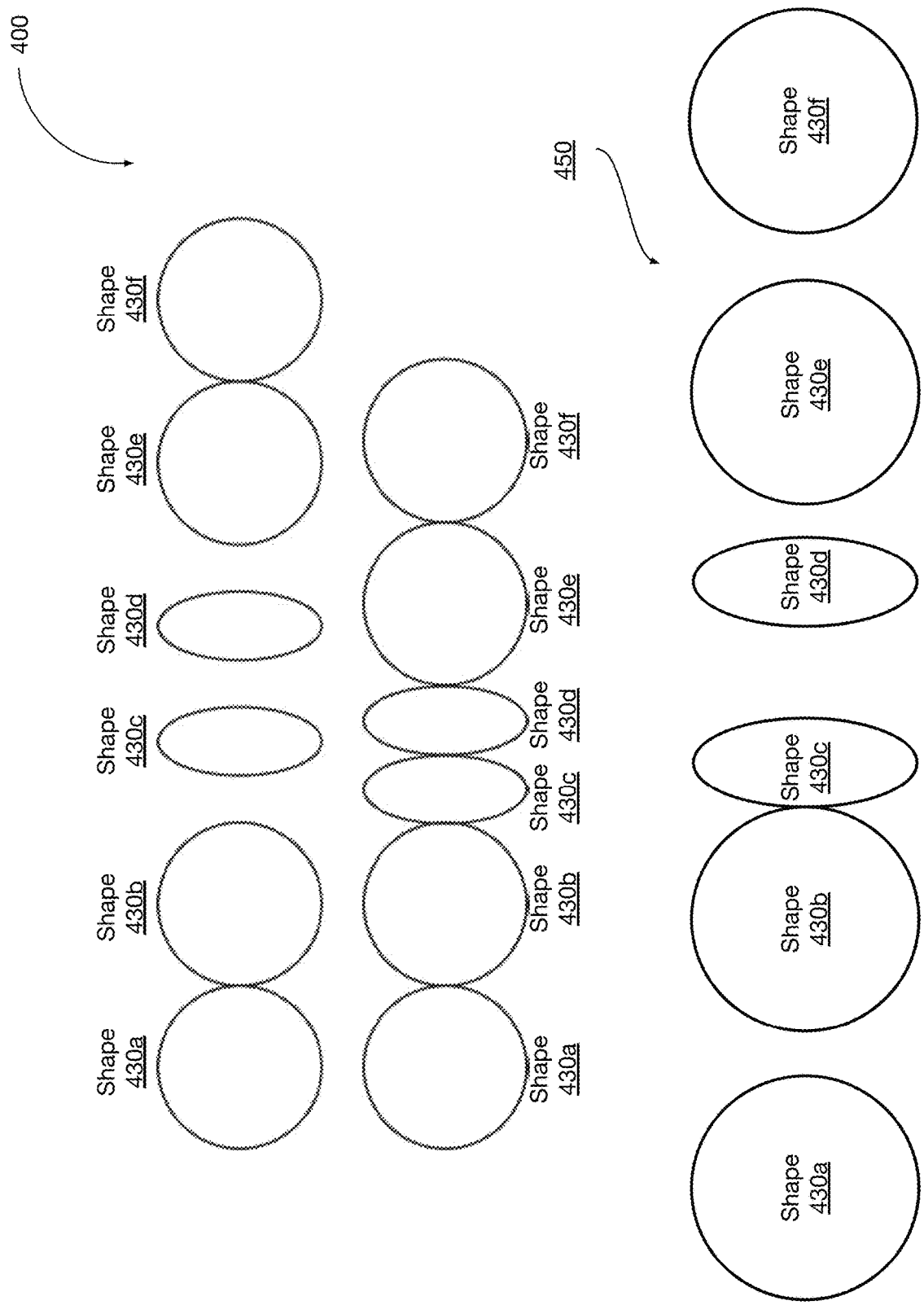

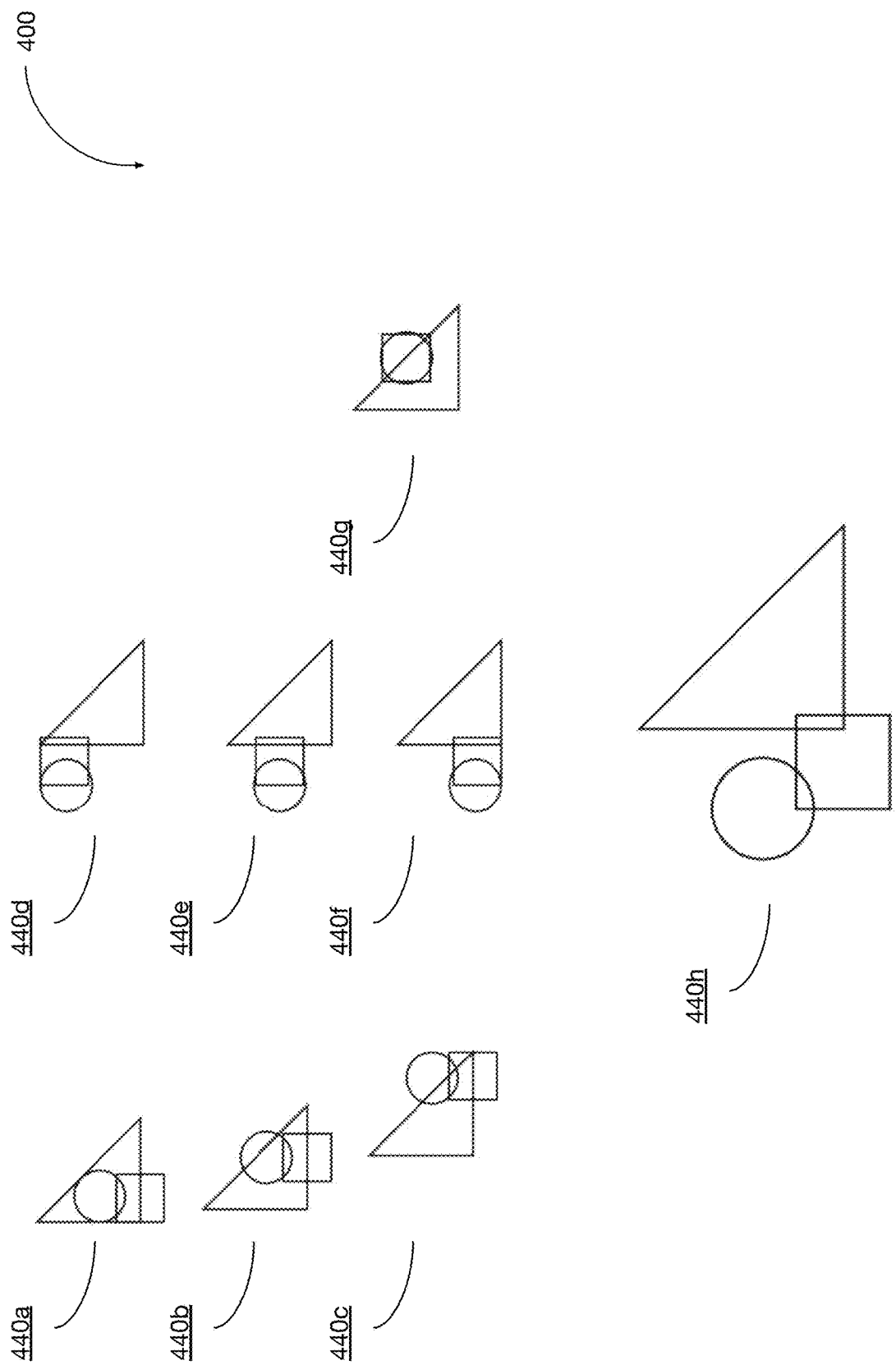

PREVIEWS FOR COMPUTER NUMERICALLY CONTROLLED FABRICATION

TECHNICAL FIELD

The subject matter described herein relates generally to computer numerically controlled fabrication and more specifically to previews for computer numerically controlled fabrication.

BACKGROUND

Computer controlled manufacturing systems, such as "3-D printers," laser cutter/engravers, computer numerically controlled milling machines, and the like, can be used to create complicated items where traditional manufacturing techniques like moldings or manual assembly fail. Such automated methods operate based on instructions that specify the cuts, engravings, patterns, and other actions to be performed. The instructions can be in the form of computer files transferred to the memory of a computer controller for the machine and interpreted at run-time to provide a series of steps in the manufacturing process.

SUMMARY

Systems, methods, and articles of manufacture, including apparatuses, are provided for visual previews for computer numerically controlled fabrication. In one aspect, there is provided a method for configuring an edge treatment for computer numerically controlled fabrication that includes: generating a user interface displaying a plurality of outcomes, each of the plurality of outcomes corresponding to a different relationship between a plurality of objects presented in the user interface and generated by applying one of a plurality of operations, the plurality of objects being selected via one or more first user inputs; and commanding a computer numerically controlled machine to deliver an electromagnetic energy to effect, in a material, one or more changes corresponding to a selected one of the plurality of outcomes, the selected one of the plurality of outcomes being selected via one or more second user inputs.

In some variations, one or more features disclosed herein including the following features can optionally be included in any feasible combination. The plurality of outcomes may exclude physically impossible combinations and redundant outcomes. The plurality of operations may comprise Boolean operations including one or more of a union, a difference, a subtraction, and an intersection. The plurality of operations may include alignment and/or spacing operations including one or more of align left, align horizontal centers, align right, align top, align vertical centers, align bottom, align centers, space centers equally, and space equally between perimeters. The plurality of objects may include a first object and a second object, and the plurality of outcomes may include a first outcome corresponding to a union of the first object and the second object, a second outcome corresponding to a subtraction of the first object from the second object, a third outcome corresponding to a subtraction of the second object from the first object, a fourth outcome corresponding to an intersection of the first object and the second objection, and a fifth outcome corresponding to a removal of the overlapping areas of the first object and the second object. The user interface displaying the plurality of outcomes may be generated without the user selecting any one of the plurality of operations. The first input or the second input may include the user interacting with a user interface element to display the plurality of outcomes before selecting a design. The plurality of outcomes may be displayed without any request by the user as a result of the plurality of objects being selected via the user interface. Each of the plurality of outcomes may be labeled with a name describing the operations applied to the plurality of objects. The plurality of outcomes may be visually grouped by similar operations. The plurality of outcomes may be modified as a result of an object of the plurality of objects being modified by the user. The computer numerically controlled machine may include a head configured to deliver the electromagnetic energy, and the commanding of the computer numerically controlled machine may include commanding the head to deliver the electromagnetic energy. The one or more first user inputs and the one or more second user inputs may be received via the user interface. The computer numerically controlled machine may be a laser computer numerically controlled machine.

In another aspect, there is provided a system for configuring an edge treatment for computer numerically controlled fabrication. The system may include at least one data processor and at least memory. The at least one memory may store instructions that cause operations when executed by the at least one data processor. The operations may include: receiving, from a user, a first input indicating an addition of an edge treatment to a material; as a result of the first input, generating a user interface configured to enable a configuration of the edge treatment; receiving, from the user interacting with the user interface, a second input configuring the edge treatment; and commanding a computer numerically controlled machine to deliver an electromagnetic energy to effect, in a material, one or more changes corresponding to the edge treatment configured by the user, the one or more changes including a variable depth engraving along at least a portion of a perimeter of the material.

In some variations, one or more features disclosed herein including the following features can optionally be included in any feasible combination. The operations may further include: determining a thickness of the material; determining, based at least on the thickness of the material, a constraint on the configuration of the edge treatment; and generating the user interface to prevent the user from configuring the edge treatment to exceed the constraint associated with the thickness of the material. The edge treatment may include a fillet. The second input configuring the edge treatment may include one or more adjustments to a radius of the fillet. The operations may further include: determining, based at least on a thickness of the material, a maximum radius of the fillet that the material is able to accommodate, the user interface being configured to prevent the user from adjusting the radius of the fillet to exceed the maximum radius that the material is able to accommodate. The user interface may be generated to include a first variation of the fillet having a first radius and a second variation of the fillet having a second radius, and the second input configuring the edge treatment may include a selection of the first variation of the fillet or the second variation of the fillet. The edge treatment may include a chamfer. The second input configuring the edge treatment may include one or more adjustments to a length and/or an angle of the fillet. The operations may further include: determining, based at least on a thickness of the material, a maximum length and/or a minimum angle of the chamfer that the material is able to accommodate, the user interface being configured to prevent the user from adjusting the length and/or the angle of the chamfer to exceed the maximum length and/or the minimum angle that the material is able to accommodate. The user interface may be generated to include a first variation of the chamfer and a second variation of the chamfer, where the first variation of the chamfer is associated with a first length and/or a first angle, where the second variation of the chamfer is associated with a second length and/or a second angle, and where the second input configuring the edge treatment includes a selection of the first variation of the chamfer or the second variation of the chamfer.

In another aspect, there is provided a computer program product including a non-transitory computer readable medium storing instructions. The instructions may result in operations when executed by at least one data processor. The operations may include: generating a user interface displaying a plurality of outcomes, each of the plurality of outcomes corresponding to a different relationship between a plurality of objects presented in the user interface and generated by applying one of a plurality of operations, the plurality of objects being selected via one or more first user inputs; and commanding a computer numerically controlled machine to deliver an electromagnetic energy to effect, in a material, one or more changes corresponding to a selected one of the plurality of outcomes, the selected one of the plurality of outcomes being selected via one or more second user inputs.

In some variations, one or more features disclosed herein including the following features can optionally be included in any feasible combination. The plurality of outcomes may exclude physically impossible combinations and redundant outcomes. The plurality of outcomes may be modified as a result of an object of the plurality of objects being modified by the user.

In another aspect, there is provided a system for configuring operations for computer numerically controlled fabrication. The system may include at least one data processor and at least memory. The at least one memory may store instructions that cause operations when executed by the at least one data processor. The operations may include: generating a user interface displaying a plurality of outcomes, each of the plurality of outcomes corresponding to a different relationship between a plurality of objects presented in the user interface and generated by applying one of a plurality of operations, the plurality of objects being selected via one or more first user inputs; and commanding a computer numerically controlled machine to deliver an electromagnetic energy to effect, in a material, one or more changes corresponding to a selected one of the plurality of outcomes, the selected one of the plurality of outcomes being selected via one or more second user inputs.

In some variations, one or more features disclosed herein including the following features can optionally be included in any feasible combination. The system may further include the computer numerically controlled machine. The plurality of outcomes may exclude physically impossible combinations and redundant outcomes.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, a connection over a network (e.g. the Internet, a wireless wide area network, a local area network, a wide area network, a wired network, or the like), via a direct connection between one or more of the multiple computing systems, and/or the like.

The details of one or more variations of the subject matter described herein are set forth in the accompanying drawings and the description below. Other features and advantages of the subject matter described herein will be apparent from the description and drawings, and from the claims. While certain features of the currently disclosed subject matter may be described for illustrative purposes in relation to configuring edge treatments and Boolean operations for computer numerically controlled fabrication, it should be readily understood that such features are not intended to be limiting.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 4B depicts an example of a user interface displaying a visual preview of spacing operations consistent with implementations of the current subject matter;

FIG. 4C depicts an example of a user interface displaying a visual preview of alignment operations consistent with implementations of the current subject matter;

When practical, similar reference numbers denote similar structures, features, or elements.

DETAILED DESCRIPTION

Figure 1:
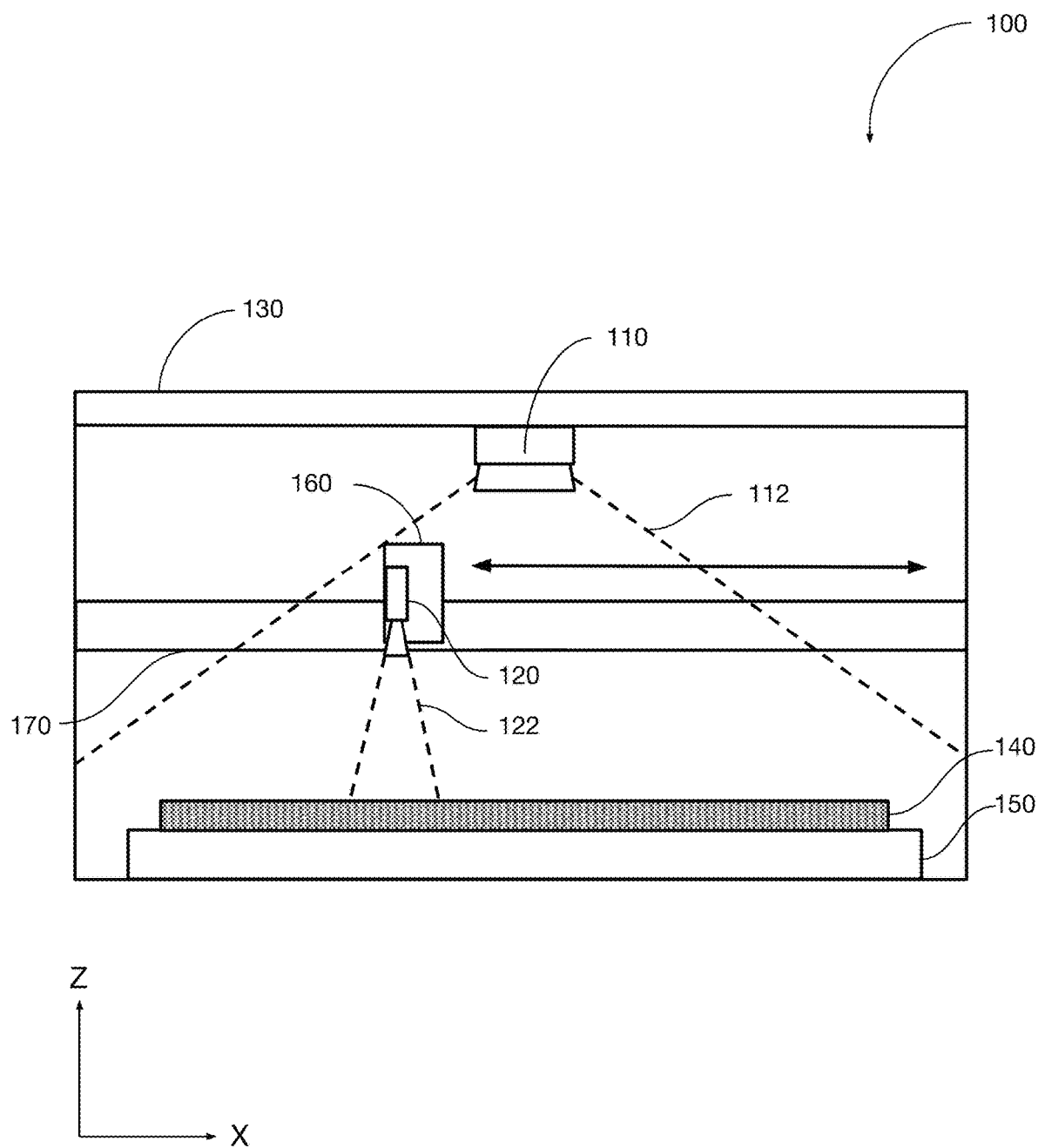
FIG. 1 depicts an elevational view of an example of a computer numerically controlled machine consistent with some implementations of the current subject matter.

A computer numerically controlled machine may include a source configured to emit electromagnetic energy, for example, in the form of a laser. Electromagnetic energy from the source may be routed to a head configured to deliver the electromagnetic energy to a destination such as, for example, a portion of a material disposed on top of a material bed and positioned in a working area defined by limits within which the head is commanded to cause delivery of the electromagnetic energy. Moreover, the working area may be inside an interior space of the computer numerically controlled machine, which may be defined by a housing including an openable barrier, for example, a lid, a door, a hatch, a flap, and/or the like, that attenuates the transmission of electromagnetic energy between the interior space and an exterior of the computer numerically controlled machine when the openable barrier is in a closed position.

The computer numerically controlled (CNC) machine may be associated with a user interface, (e.g., graphical user interface (GUI)) configured to enable the generation and configuration of one or more designs in a workpiece, through one or more processes that can include subtractive processing (e.g., by removing some amount of a material) and/or additive processing (e.g., by depositing some amount of a material) of the workpiece. The user interface may be on the CNC machine, or on a network connected machine (e.g., a local laptop or desktop computer, a remote laptop or desktop computer or server with a network connection to a controller of the CNC machine, a smartphone, a tablet, etc.). The user interface can be configured to allow a user to create a design to be created with the CNC machine. A user interface consistent with the current disclosure may provide one or more features consistent with the descriptions provided that improve the user experience by, among other possible advantages, providing visually informative previews to allow a user to quickly understand, and select based on that understanding, how two or more objects may be associated with each other to form various physical outcomes with the workpiece, either through additive or subtractive processing.

It will be understood from the current disclosure that various types of computer numerically controlled (CNC) machines may be used in association with one or more of the features described herein. For example, a CNC machine may be a machine that is used to perform additive processing and/or subtractive processing under the control of a computer (which may be the controller for the CNC machine itself in some implementations). The computer numerically controlled machine may include one or more motors (or other actuators) that move one or more heads performing the addition and/or removal of material. For a CNC machine that performs additive processing by depositing a material, the one or more heads may incorporate nozzles that spray or release polymers. Alternatively and/or additionally, the heads can include an ink source such as a cartridge or pen. In the case of 3D printing, material can be built up layer by layer to create a 3-dimensional object. A CNC machine that performs subtractive processing by removing material can include, without limitation, one or more of a laser or other source of focused or unfocused electromagnetic energy or heat, a cutting blade or blades (e.g., that rotate, oscillate, or the like), a grinding device, etc. The example of a laser CNC machine is used in the following description for the purposes of informative illustration. It will be understood that many of the processes described can also be readily applied to a CNC machine that performs additive processing.

In a laser CNC machine, the electromagnetic energy delivered to the material may effect one or more changes in the material. For example, the one or more changes in the material may include a removal of one or more portions of the material, which may be achieved by one or more cuts that partially and/or fully penetrates the material. In some example embodiments, the one or more changes may correspond to a design formed by combining or otherwise modifying a relationship between two or more objects. For instance, the one or more changes may correspond to a design formed by applying, to multiple objects, one or more Boolean operations such as union, subtraction, intersection, removal of the overlapping areas of two or more of the objects, and/or the like. In another instance, the one or more changes may correspond to a design formed by aligning multiple objects such as, for example, align left, align horizontal centers, align right, align top, align vertical centers, align bottom, and align centers. In yet another instance, the one or more changes may correspond to a design formed by spacing multiple objects such as, for example, with equal space between object edges or perimeters, equal space between object centers, etc. Alternatively and/or additionally, the one or more changes may correspond to a 3-dimensional treatment applied to one or more edges along a perimeter of the material or along an edge or transition between two parts of the material with differing heights or depths. Examples of edge treatments may include a chamfer (e.g., a sloped or angled edge) and a fillet (e.g., a rounded or smooth edge), which may be achieved by delivering electromagnetic energy to create a variable depth engraving along at least a portion of the perimeter of the material.

In some example embodiments, as a result of a user selecting two or more objects, a display may be updated to present a preview of a selection of the feasible physical outcomes generated by applying various operations (e.g., Boolean, alignment, spacing, etc.) to the two or more objects based at least in part on whether the objects are to be cut all the way or partially through a material, etched into the material to a given depth, etc. In a CNC machine that uses one or more of cutting, grinding, milling, etc. tools, subtractive processes can include changing surface roughness, cutting completely or partially through a material, etc. For a CNC machine that performs additive processing (e.g., a 3D printer), changes in a workpiece may involve forming of shapes in both 2-dimensional and 3-dimensional space. Such shapes may be represented in a user interface in a manner similar to the subtractive processing for a laser CNC machine. A user interface consistent with the current disclosure can include as an input or setting an indication of a type of treatment to be performed and/or whether some combination of treatments may be possible (e.g., for a CNC machine that can perform both additive and subtractive processing).

In one example, as a result of the user selecting a first object and a second object, a user interface display may be updated to present a preview of a first outcome corresponding to a union of the first object and the second object, a second outcome corresponding to a subtraction of the first object from the second object, a third outcome corresponding to a subtraction of the second object from the first object, a fourth outcome corresponding to an intersection of the first object and the second object, and a fifth outcome corresponding to a removal of the overlapping areas of between the first object and the second object.

The preview presented by the display may, in some implementations, filter the outcomes presented to preview only those outcomes which are not redundant and which are physically possible. For example, one or more redundant and/or physically impossible combinations of the first object and the second object selected by the user may not be presented by the display. As an example, two identical objects that are spaced via "equal space between edges" and "equal space between centers" will yield the same result, so one of the results might be suppressed.

The user interface may enable a user to designate each object as, a cut object, an etch object, an addition object, or any other type of object consistent with the types of subtractive and/or additive processes achievable by the CNC machine. In some implementations, a user may additionally or alternatively be able to designate other features such as a depth of cut or etch, a grind pattern, a type of material to be added, etc. Such factors may be incorporated into the filtering of the outcomes to be presented. For example, if one object is designated to be cut all the way through the material while a second object is designated to be treated as "etch," a different set of physically possible and non-redundant combinations of the objects than if both objects are designated to be cut all the way through the material.

A user interface display may present previews of multiple outcomes representing each resultant physical outcome generated by applying various Boolean operations which take into consideration the designation of either cut or etch of each object of the plurality of objects to be combined. Furthermore, additional effects or designations, such as depth of cut, etching pattern, etc., can be applied by the user. The predicted output of an operation or effect can become a new object in the design. For example, the predicted output or design can include consideration of designations or effects delivered to the material when the objects in the design overlap (e.g. overlapping areas cut once or twice, depth of effect on overlapping areas is equal to or deeper than non-overlapping areas, etc.). If the predicted output of two or more operations provides the same effect delivered to the material, i.e. redundant effects, only one predicted output or effect may be displayed by the user interface for those operations.

In another example, if the design is modified by the user while the predicted output(s) are displayed, the predicted output(s) displayed may change with the modifications, such as to remove or add a predicted output or to modify the predicted outputs already displayed. The computer numerically controlled (CNC) machine may deliver electromagnetic energy to effect, in the material, one or more changes corresponding to one of the plurality of non-redundant, physically possible outcomes selected by the user via the user interface. The user can select the desired operation of the CNC machine directly from the preview presented by the user interface. In some embodiments, the user can move or edit the objects dynamically while the display preview is shown, such that the user can visualize how the result or design changes when different operations are applied. The user interface may be a graphic user interface, a voice or audio interface, or another interface having a suitable selection method.

In an example implementation, the user interface may present a "default" join action for two or more shapes or objects. In a non-limiting case, the default action shown on screen could be a Boolean join of the two or more objects, and at least one other option, such as for example an overlap without join can be shown in a preview part of the user interface. In currently available solutions, when two shapes overlap a default behavior might be to perform the (e.g., engrave) operation twice. A region in which the two objects overlap would therefore be engraved twice and might be darker or deeper or affected differently than the non-overlapping parts. Consistent with the current disclosure, the default behavior on any overlapping shapes can automatically be a Boolean join (i.e., a single operation across the union of shapes) with an option among presented preview options including an overlap without join (where the overlapping material of two objects is affected twice, the overlap between three objects is affected three times, etc.). In one example, the relationship between two overlapping objects may default to a Boolean join. Optionally, some other attribute besides (or optionally in addition to) overlap may be used to signify which objects are default joined. For example, objects that have a same or similar color representation in the user interface may be default joined. In examples in which a default initial relationship between objects is presented, a user can be able to change to a different relationship among objects via the presented preview options.

Boolean operations are one example of the operations which can be used to modify a relationship between two or more objects. Other operations can be, for example, alignment operations (e.g. left align objects, center align objects, right align objects, justify objects, etc.), spacing operations (e.g. equal space between object edges, equal space between object centers, etc.) and so forth.

In some example embodiments, the user interface (UI) may further support the configuration of an edge treatment to be applied to some part of a workpiece. As such, the user may interact with the user interface in order to add, to an edge of the material or to any other part of a workpiece having a height or depth, an edge treatment such as, for example, a fillet (e.g., a rounded or smooth edge) or a chamfer (e.g., a sloped or angled edge). Moreover, the user may interact with the user interface to configure the edge treatment including, for example, by modifying one or more characteristics of the edge treatment, selecting a variation of the edge treatment presented by the user interface, and/or the like. It should be appreciated that the configuration of the edge treatment may be constrained by one or more characteristics of the material including, for example, a thickness, a height, a material composition, a material density, and/or the like. For example, the possible modifications to the edge treatment that may be accomplished via the user interface and/or the variations of the edge treatment presented in the user interface may be determined based at least on the one or more characteristics of the material. Alternatively and/or additionally, it should be appreciated that the configuration of the edge treatment may be constrained by the one or more characteristics of the computer numerically controlled (CNC) machine. For example, a CNC machine may be a machine that is used to perform additive processing (e.g., by depositing a material) and/or subtractive processing (e.g., by removing a material) under the control of a computer, and each CNC machine may be further limited by power, resolution, etc.

In some example embodiments, the user may interact with the user interface in order to adjust, for example, a radius of a fillet that may be added as an edge treatment to at least a portion of the perimeter of the material. The maximum radius of the fillet that the material is able to accommodate may be determined based at least on the height (or thickness) of the material. Accordingly, the user interface may not permit adjustments beyond the maximum radius that the material is able to accommodate given the height (or thickness) of the material. Alternatively and/or additionally, the user may interact with the user interface to adjust the length and/or the angle of a chamfer that may be added as an edge treatment to at least a portion of the perimeter of the material. The height (or thickness) of the material may determine the maximum length and the minimum angle of the chamfer that may be added to the material. As such, the user may be prevented from making adjustments beyond the maximum length and/or the minimum angle that the material is able to accommodate.

In some example embodiments, the user interface may display multiple variations of a fillet that may be added to the edge of the material including, for example, a first variation of the fillet having a first radius and a second variation of the fillet having a second radius. As noted, the maximum radius of the fillet that the material is able to accommodate may be determined based at least on the thickness (or height) of the material. Accordingly, neither the first radius of the first variation of the fillet nor the second radius of the second variation of the fillet may exceed the maximum radius of the fillet that the material is able to accommodate. Alternatively and/or additionally, the user interface may display multiple variations of a chamfer that may be added to the edge of the material including, for example, a first variation of the chamfer having a first length (or angle) and a second variation of the chamfer having a second length (or angle). Neither the first length (or angle) of the first variation of the chamfer nor the second length (or angle) of the second variation of the chamfer may exceed a maximum length (or minimum angle) of the chamfer that the material is able to accommodate based on the thickness (or height) of the material.

In some embodiments, an edge treatment can be displayed by the user interface (UI) to be affected by a CNC machine. For example, a cross-section of a material can be rendered by the UI based on information about the material. The material information may be stored in memory and referenced by an identifier on the material, may be based on measurements of the material by the CNC machine, etc. The fillet can be a shape other than a circle, ellipse, etc. The user may also select a point on the edges of a rendered image to create a fillet, such as a parabolic fillet, to connect the edges. Based on the type of material and/or the CNC machine or laser parameters, the user may be "warned against" selecting some edges automatically. The edge treatment display can also optionally include features similar to those discussed above in regards to combinations of two or more objects, for example to show previews to a user illustrating physically possible combinations or two or more shapes or objects to create a more complex edge treatment than a simple curved radius. As discussed above, redundant combinations may be excluded, as may physically impossible combinations. An example of a physically impossible combination could include one in which material would need to be subtracted from a part of a workpiece that is not accessible from a laser positioned above a material bed upon which the workpiece is positioned.

As used herein, the term "cutting" can generally refer to altering the appearance, properties, and/or state of a material. Cutting can include, for example, making a through-cut, engraving, bleaching, curing, burning, etc. Engraving, when specifically referred to herein, indicates a process by which a computer numerically controlled machine modifies the appearance of the material without fully penetrating it. For example, in the context of a laser cutter, it can mean removing some of the material from the surface, or discoloring the material e.g., through an application of focused electromagnetic energy delivering electromagnetic energy as described below.

As used herein, the term "kerf" generally refers to the width of material that is removed by a cutting process. Kerf may also refer to the act of cutting or carving a material, or the groove or slit created by cutting or sawing a material.

As used herein, the term "laser" includes any electromagnetic energy or focused or coherent energy source that (in the context of being a cutting tool) uses photons to modify a substrate or cause some change or alteration upon a material impacted by the photons. Lasers (whether cutting tools or diagnostic) can be of any desired wavelength, including for example, microwave, lasers, infrared lasers, visible lasers, UV lasers, X-ray lasers, gamma-ray lasers, or the like.

Also, as used herein, "cameras" includes, for example, visible light cameras, black and white cameras, IR or UV sensitive cameras, individual brightness sensors such as photodiodes, sensitive photon detectors such as a photomultiplier tube or avalanche photodiodes, detectors of infrared energy far from the visible spectrum such as microwaves, X-rays, or gamma rays, optically filtered detectors, spectrometers, and other detectors that can include sources providing electromagnetic energy for illumination to assist with acquisition, for example, flashes, UV lighting, etc.

Also, as used herein, reference to "real-time" actions includes some degree of delay or latency, either programmed intentionally into the actions or as a result of the limitations of machine response and/or data transmission. "Real-time" actions, as used herein, are intended to only approximate an instantaneous response, or a response performed as quickly as possible given the limits of the system, and do not imply any specific numeric or functional limitation to response times or the machine actions resulting therefrom.

Also, as used herein, unless otherwise specified, the term "material" is the material that is on the bed of the computer numerically controlled machine. For example, if the computer numerically controlled machine is a laser cutter, lathe, or milling machine, the material may be the raw material, stock, and/or the like that is placed in the computer numerically controlled machine for cutting. In another example, if the computer numerically controlled machine may be a 3-D printer, in which case the term "material" may refer to either the current layer, or previously existent layers or substrate, of an object being crafted by the 3-D printing process. In yet another example, if the computer numerically controlled machine is a printer, the material may be the paper onto which the computer numerically controlled machine deposits its ink. The term workpiece is also used in certain examples to refer to material having or being in progress toward a design resulting from one or more additive and/or subtractive processes of the CNC machine as determined by user input, for example via the user interface.

Figure 2:
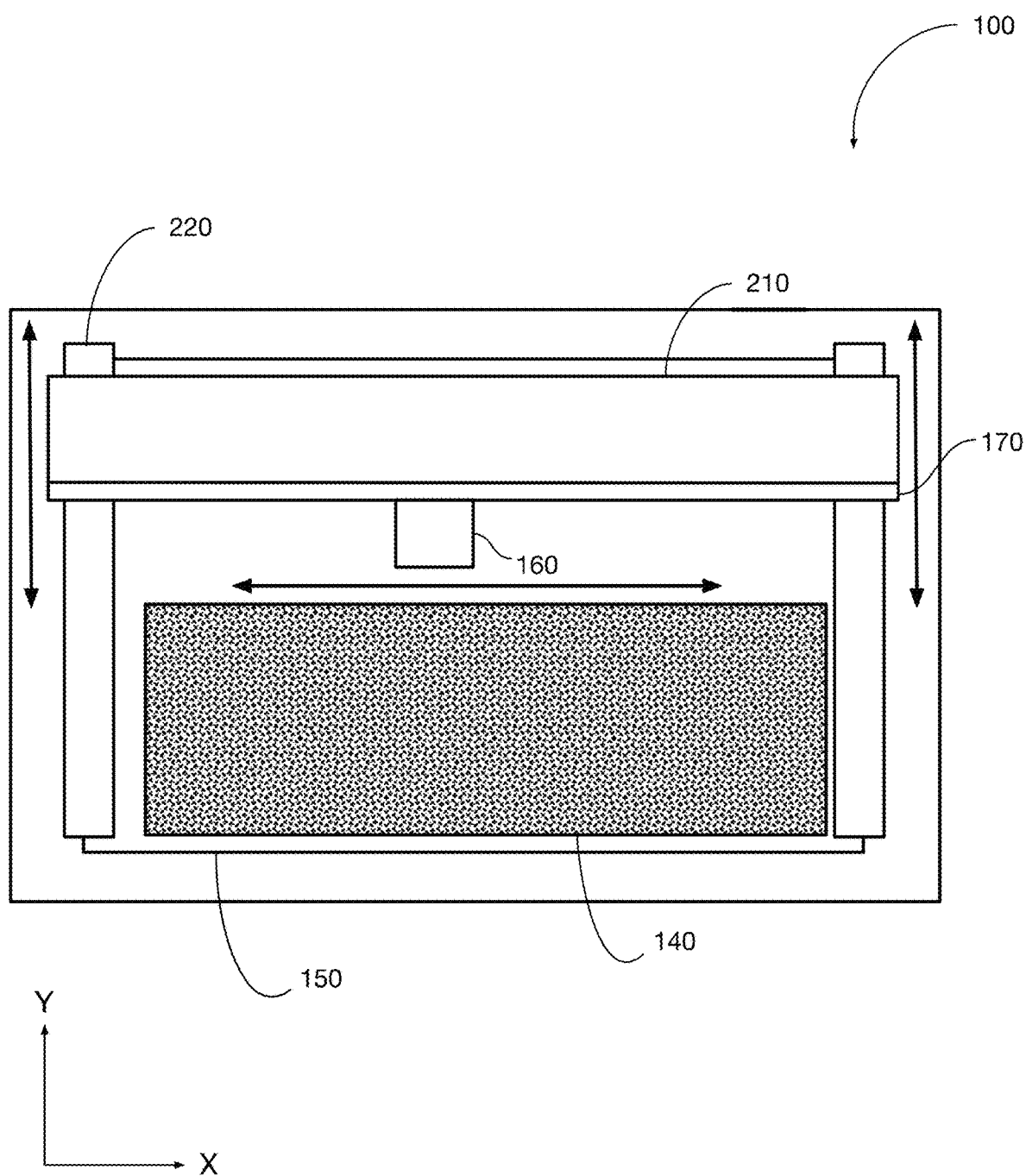
FIG. 2 depicts a top view of an example of a computer numerically controlled machine consistent with implementations of the current subject matter.
Figure 3A:
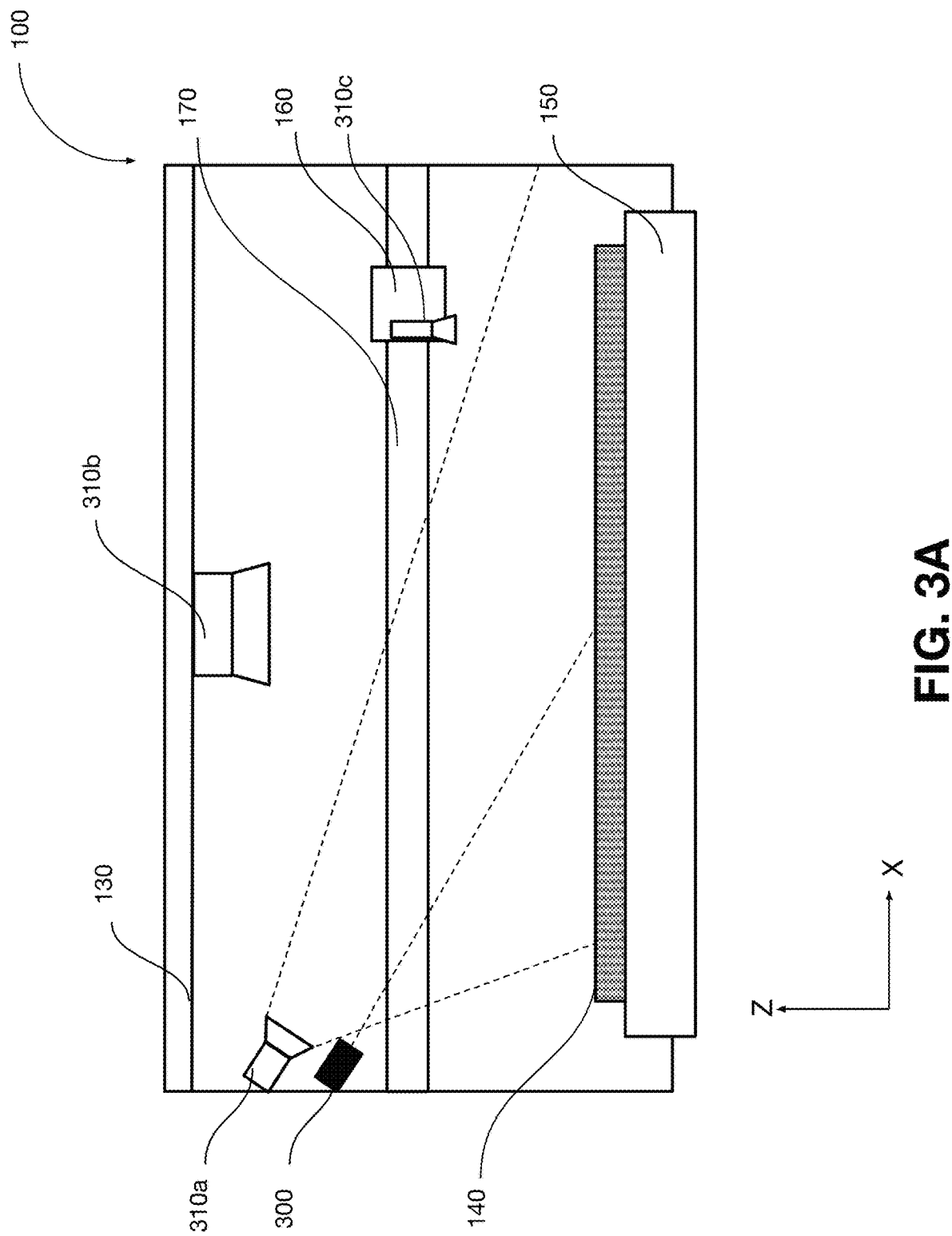
FIG. 3A depicts a transparent side view of an example of a computer numerically controlled machine consistent with implementations of the current subject matter.
Figure 3B:
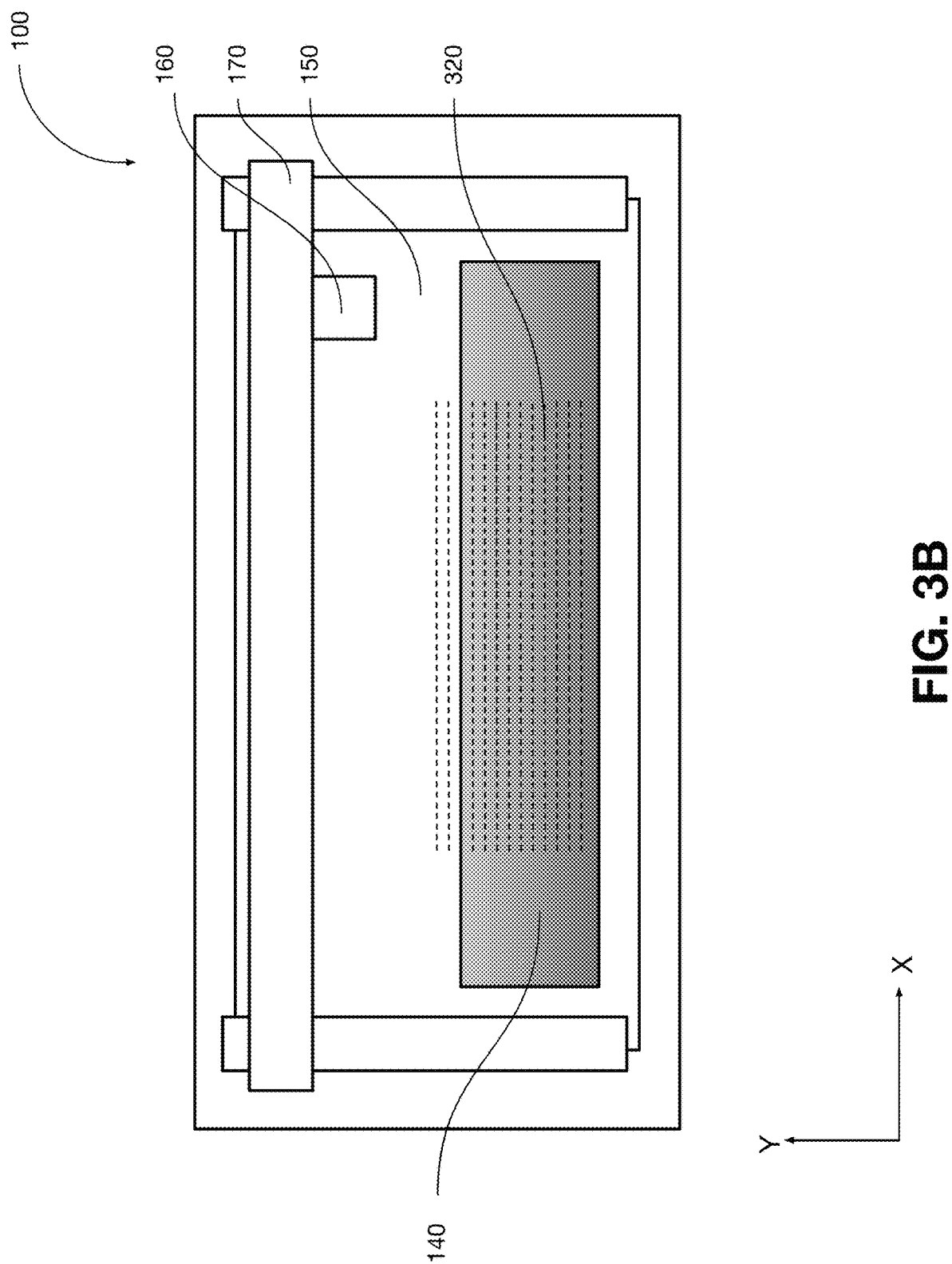
FIG. 3B depicts a transparent top view of an example of a computer numerically controlled machine consistent with implementations of the current subject matter.

FIG. 1 depicts an elevational view of an example of a computer numerically controlled machine 100, consistent with implementations of the current subject matter. The example of the computer numerically controlled machine 100 shown in FIG. 1 may include a camera positioned to capture an image of an entire material bed 150 and another camera positioned to capture an image of a portion of the material bed 150, consistent with some implementations of the current subject matter. FIG. 2 depicts a top view of the example of the computer numerically controlled machine 100 shown in FIG. 1.

As noted above, in an illustrative but non-limiting implementation of the current subject matter, the computer numerically controlled machine 100 may be a laser cutter/engraver that uses electromagnetic energy (e.g., laser) to perform various forms of subtractive processing including, for example, cutting, engraving, and/or the like. It will be apparent to one of ordinary skill in the art based on the current disclosure that various features described below can be implemented with other types of computer numerically controlled machines. The computer numerically controlled machine 100 can be, for example, a lathe, an engraver, a 3D printer, a milling machine, a drill press, a saw, and/or the like.

As a laser cutter/engraver, the computer numerically controlled machine 100 may be subject to particularly challenging design constraints. For example, a laser cutter/engraver is subject to regulatory guidelines that restrict the egress of electromagnetic energy from the unit when operating, making it challenging for light to enter or escape the unit safely, for example to view or record an image of the contents. The beam of a laser cutter/engraver must be routed from the emitter to the area to be machined, potentially requiring a series of optical elements such as lenses and mirrors. The beam of a laser cutter/engraver is easily misdirected, with a small angular deflection of any component relating to the beam path potentially resulting in the beam escaping the intended path, potentially with undesirable consequences. A laser beam may be capable of causing material destruction if uncontrolled. A laser cutter/engraver may require high voltage and/or radio frequency power supplies to drive the laser itself.

Liquid cooling is common in laser cutter/engravers to cool the laser, requiring fluid flow considerations. Airflow is important in laser cutter/engraver designs, as air may become contaminated with byproducts of the laser's interaction with the material such as smoke, which may in turn damage portions of the machine for example fouling optical systems. The air exhausted from the machine may contain undesirable byproducts such as, for example, smoke that must be routed or filtered, and the machine may need to be designed to prevent such byproducts from escaping through an unintended opening, for example by sealing components that may be opened. Unlike most machining tools, the kerf—the amount of material removed during the operation—is both small and variable depending on the material being processed, the power of the laser, the speed of the laser, and other factors, making it difficult to predict the final size of the object.

Also unlike most machining tools, the output of the laser cutter/engraver is very highly dependent on the speed of operation; a momentary slowing can destroy the workpiece by depositing too much laser energy. In many machining tools, operating parameters such as tool rotational speed and volume of material removed are easy to continuously predict, measure, and calculate, while laser cutter/engravers are more sensitive to material and other conditions. In many machining tools, fluids are used as coolant and lubricant; in laser cutter/engravers, the cutting mechanism does not require physical contact with the material being affected, and air or other gasses may be used to aid the cutting process in a different manner, by facilitating combustion or clearing debris, for example.

Referring again to FIG. 1, the computer numerically controlled machine 100 can have a housing surrounding an enclosure or interior area defined by the housing. The housing can include walls, a bottom, and one or more openings to allow access to the computer numerically controlled machine 100. In addition, the material bed 150 may be disposed at least partially within the housing of the computer numerically controlled machine 100 and may include a top surface on which the material 140 generally rests.

In the example of the computer numerically controlled machine 100 shown in FIG. 1, the computer numerically controlled machine 100 can also include an openable barrier as part of the housing to allow access between an exterior of the computer numerically controlled machine and an interior space of the computer numerically controlled machine. The openable barrier can include, for example, one or more doors, hatches, flaps, lids, and the like that can actuate between an open position and a closed position. The openable barrier can attenuate the transmission of light between the interior space and the exterior when in a closed position. Optionally, the openable barrier can be transparent to one or more wavelengths of light or be comprised of portions of varying light attenuation ability. One type of openable barrier can be a lid 130 that can be opened or closed to put material 140 on the material bed 150 on the bottom of the enclosure.

Various example implementations discussed herein include reference to a lid. It will be understood that absent explicit disclaimers of other possible configurations of the operable barrier or some other reason why a lid cannot be interpreted generically to mean any kind of openable barrier, the use of the term lid is not intended to be limiting. One example of an openable barrier can be a front door that is normally vertical when in the closed position and can open horizontally or vertically to allow additional access. There can also be vents, ducts, or other access points to the interior space or to components of the computer numerically controlled machine 100. These access points can be for access to power, air, water, data, etc. Any of these access points can be monitored by cameras, position sensors, switches, etc. If they are accessed unexpectedly, the computer numerically controlled machine 100 can execute actions to maintain the safety of the user and the system, for example, a controlled shutdown. In other implementations, the computer numerically controlled machine 100 can be completely open (i.e. not having a lid 130, or walls). Any of the features described herein can also be present in an open configuration, where applicable.

The computer numerically controlled machine 100 can have one or more heads including, for example, the head 160, which can be operated to alter the material 140. The head 160 may be configured to steer a beam of electromagnetic energy to a desired location on the material 140 positioned in the working area of the computer numerically controlled machine 100. For instance, the head 160 may be mobile including by translating and/or rotating to locate a beam of electromagnetic energy from a source configured to generate and/or emit the electromagnetic energy. Alternatively, the head 160 may be stationary and the beam of electromagnetic energy may be located by translating and/or rotating one or more optical components configured to route the electromagnetic energy from the head 160. It should be appreciated that the computer numerically controlled machine 100 may include multiple heads that operate independently or in unison to locate the beam of electromagnetic energy.

In some implementations of the current subject matter, the head 160 can be configured to include a combination of optical, electronic, and/or mechanical components that can, in response to commands, cause a laser beam or electromagnetic energy to be delivered to cut or engrave the material 140. The source (e.g., an emitter and/or the like) generating the electromagnetic energy may be part of the head 160 or separate from the head 160. The computer numerically controlled machine 100 can also execute operation of a motion plan for causing movement of the head 160 in implementations where the head 160 is configured to be mobile. Electromagnetic energy effecting one or more changes in the material 140 that is at least partially contained within the interior space of the computer numerically controlled machine 100 may therefore be delivered by moving the head 160. In one implementation, the position and orientation of the optical elements inside the head 160 can be varied to adjust the position, angle, or focal point of a laser beam. For example, mirrors can be shifted or rotated, lenses translated, etc. The head 160 can be mounted on a translation rail 170 that is used to move the head 160 throughout the enclosure. In some implementations the motion of the head 160 can be linear, for example on an X axis, a Y axis, or a Z axis. In other implementations, the head 160 can combine motions along any combination of directions in a rectilinear, cylindrical, or spherical coordinate system.

A working area for the computer numerically controlled machine 100 can be defined by the limits within which the head 160, whether stationary or mobile, can cause delivery of a machining action, or delivery of a machining medium, for example electromagnetic energy. The working area can be inside the interior space defined by the housing. It should be understood that the working area can be a generally three-dimensional volume and not a fixed surface. For example, if the range of travel of a vertically oriented laser cutter is a 10"×10" square entirely over the material bed 150, and the laser from the laser beam comes out of the laser cutter at a height of 4 inches above the material bed of the computer numerically controlled machine, that 400 square-inch volume can be considered to be the working area.

The working area can be defined by the extents of positions in which material 140 can be worked by the computer numerically controlled machine 100. As such, the boundaries of the working area may not necessarily be defined or limited by the range of travel of any one component. For example, if the head 160 could turn at an angle, then the working area could extend in some direction beyond the travel of the head 160. By this definition, the working area can also include any surface, or portion thereof, of any material 140 placed in the computer numerically controlled machine 100 that is at least partially within the working area, if that surface can be worked by the computer numerically controlled machine 100. Similarly, for oversized material, which may extend even outside the computer numerically controlled machine 100, only part of the material 140 might be in the working area at any one time.

The translation rail 170 can be any sort of translating mechanism that enables movement of the head 160 in the X-Y direction, for example a single rail with a motor that slides the head 160 along the translation rail 170, a combination of two rails that move the head 160, a combination of circular plates and rails, a robotic arm with joints, etc.

Components of the computer numerically controlled machine 100 can be substantially enclosed in a case or other enclosure. The case can include, for example, windows, apertures, flanges, footings, vents, etc. The case can also contain, for example, a laser, the head 160, optical turning systems, cameras, the material bed 150, etc. To manufacture the case, or any of its constituent parts, an injection-molding process can be performed. The injection-molding process can be performed to create a rigid case in a number of designs. The injection molding process may utilize materials with useful properties, such as strengthening additives that enable the injection molded case to retain its object when heated, or absorptive or reflective elements, coated on the surface or dispersed throughout the material for example, that dissipate or shield the case from laser energy. As an example, one design for the case can include a horizontal slot in the front of the case and a corresponding horizontal slot in the rear of the case. These slots can allow oversized material to be passed through the computer numerically controlled machine 100.

Optionally, there can be an interlock system that interfaces with, for example, the openable barrier, the lid 130, door, and the like. Such an interlock is required by many regulatory regimes under many circumstances. The interlock can then detect a state of opening of the openable barrier, for example, whether a lid 130 is open or closed. In some implementations, an interlock can prevent some or all functions of the computer numerically controlled machine 100 while an openable barrier, for example the lid 130, is in the open state (e.g. not in a closed state). The reverse can be true as well, meaning that some functions of the computer numerically controlled machine 100 can be prevented while in a closed state. There can also be interlocks in series where, for example, the computer numerically controlled machine 100 will not operate unless both the lid 130 and the front door are both closed. Furthermore, some components of the computer numerically controlled machine 100 can be tied to states of other components of the computer numerically controlled machine, such as not allowing the lid 130 to open while the laser is on, a movable component moving, a motor running, sensors detecting a certain gas, etc. In some implementations, the interlock can prevent emission of electromagnetic energy from the head 160 when detecting that the lid 130 is not in the closed position.

The head 160 of the computer numerically controlled machine 100 may deliver, to the material 140 disposed on the material bed 150, an electromagnetic energy to effect one or more changes in the material 140. The one or more changes in the material 140 may include a removal of one or more portions of the material 140, which may be achieved by one or more cuts that partially and/or fully penetrate the material 140. In some example embodiments, the one or more changes may correspond to a design formed by combining two or more objects. For example, the one or more changes may correspond to a design formed by applying, to the two or more objects, one or more Boolean operations such as union, subtraction, intersection, difference and/or the like. Alternatively and/or additionally, the one or more changes may correspond to a three-dimensional treatment applied to one or more edges along a perimeter of the material 140. Examples of edge treatments may include a chamfer (e.g., a sloped or angled edge) and a fillet (e.g., a rounded or smooth edge), which may be achieved by delivering electromagnetic energy to create a variable depth engraving along at least a portion of the perimeter of the material 140.

In some example embodiments, the computer numerically controlled machine 100 may be associated with a user interface configured to enable the generation and configuration of a design. For example, a user may interact with the user interface to select two or more objects. After the two or more objects are selected, the user interface may be updated to display a preview of a selection of outcomes generated by applying various operations (e.g., Boolean, alignment, spacing, etc.) to the two or more objects. For instance, after the user selects a first object and a second object, the user interface may be updated to display a preview of a first outcome corresponding to a union of the first object and the second object, a second outcome corresponding to a subtraction of the first object from the second object, a third outcome corresponding to a subtraction of the second object from the first object, a fourth outcome corresponding to an intersection of the first object and the second object, and a fifth outcome corresponding to a difference between the first object and the second object. It should be appreciated that the user interface may be updated to display the selection of outcomes generated by applying various operations to the two or more objects without the user selecting any particular operation.

Figure 4A:
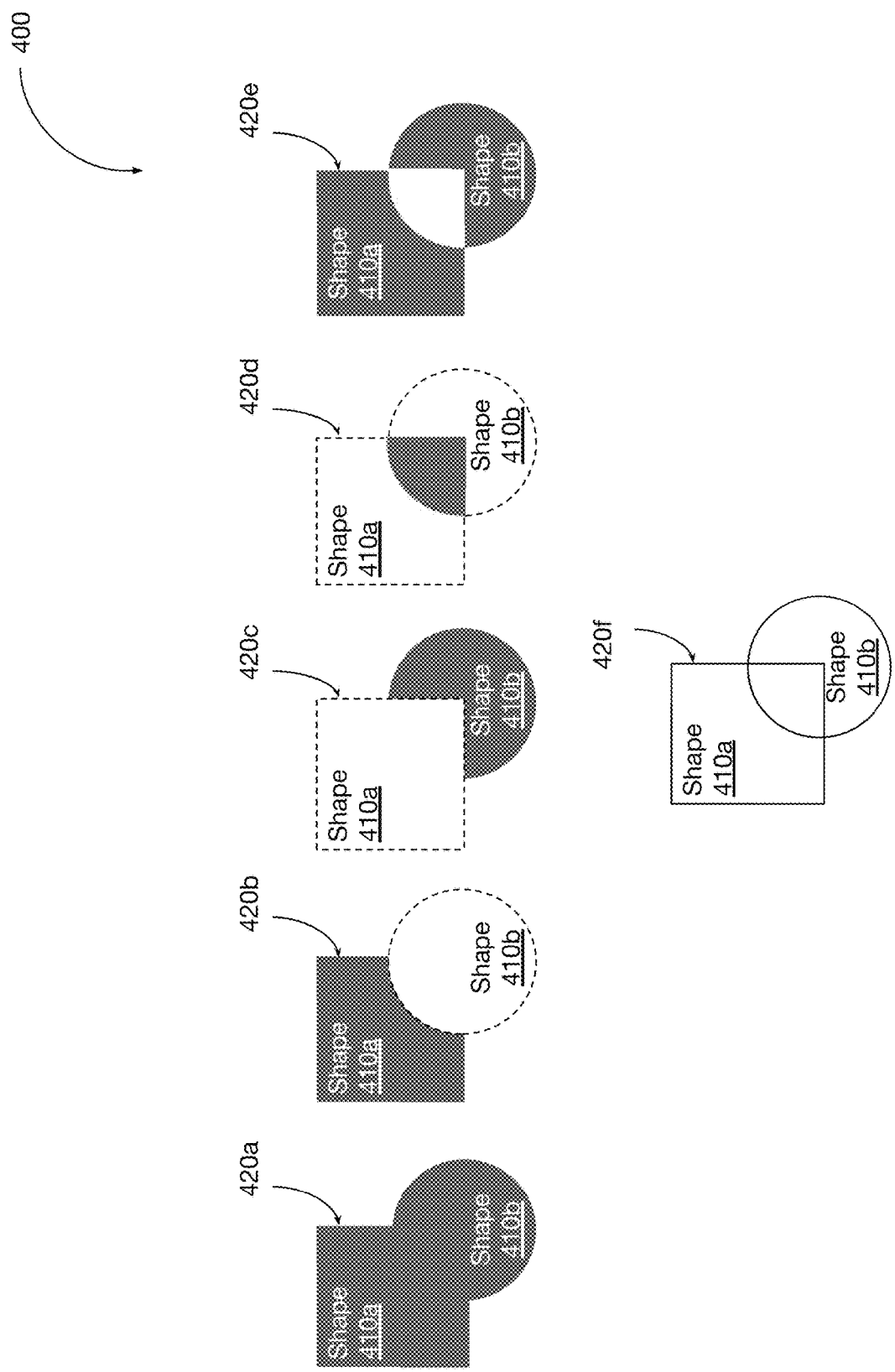
FIG. 4A depicts an example of a user interface displaying a visual preview of a Boolean operations consistent with implementations of the current subject matter.

To further illustrate, FIG. 4A depicts an example of a user interface 400 displaying a visual preview of Boolean operations consistent with implementations of the current subject matter. Referring to FIG. 4A, the user interface 400 may be generated after a user selects a first object 410*a* (e.g., a square) and a second object 410*b* (e.g., a circle). It will be understood that while the example of FIG. 4A and its accompanying description discuss, for the sake of simplicity of explanation, the current subject matter in the context of an example in which the relationship of two objects is modified, this is in no way intended to be limiting. Features herein can be applicable to user interface features for assisting a user in modify relationships between any plurality of objects. As shown in FIG. 4A, after the selection of the first object 410*a* and the second object 410*b* in the currently displayed arrangement of objects 420*f*, the user interface 400 may be updated to display (for example, via a user interface element such as a preview pane, floating window, etc.) a selection of outcomes, each of which corresponds to a combination of the first object 410*a* and the second object 410*b* generated by the application of a Boolean operation. For example, the user interface 400 may display a plurality of non-redundant, physically possible outcomes including a first outcome 420*a* corresponding to a union of the first object 410*a* and the second object 410*b*, a second outcome 420*b* corresponding to a subtraction of the second object 410*b* from the first object 410*a*, a third outcome 420*c* corresponding to a subtraction of the first object 410*a* from the second object 410*b*, a fourth outcome 420*d* corresponding to an intersection of the first object 410*a* and the second object 410*b*, and a fifth outcome 420*e* corresponding to a difference between the first object 410*a* and the second object 420*b*.

The user may interact with the user interface 400 to select one of the plurality of outcomes. In some instances, the user may further interact with the user interface 400 to modify the selected outcome. For example, the user may adjust the positioning of the objects in the design, or change the dimension(s) of one or more objects in the design. The computer numerically controlled machine 100 may deliver, to the material 140, electromagnetic energy to effect one or more changes corresponding to the selected (and optionally subsequently modified) outcome of the plurality of outcomes resulting from user interaction with the user interface 400.

Additionally and/or alternatively, other operations such as alignment operations, spacing operations, cut designations, or etch designations, may be applied to the design or to the objects in the design. To further illustrate, FIG. 4B depicts an example of a user interface 400 displaying a visual preview of spacing operations consistent with implementations of the current subject matter. Referring to FIG. 4B, the user interface 400 may be generated after a user selects, in the currently displayed arrangement of objects 450, a plurality of objects including (in this illustrative but non-limiting example) a first object 430*a* (e.g., a circle), a second object 430*b* (e.g., a second circle), a third object 430*c* (e.g., an oval), a fourth object 430*d* (e.g., a second oval), a fifth object 430*e* (e.g., a circle), and a sixth object 430*f* (e.g., a circle). As shown in FIG. 4B, after the selection of the first object 430*a*, the second object 430*b*, the third object 430*c*, the fourth object 430*d*, the fifth object 430*e*, and the sixth object 430*f*, the user interface 400 may be updated to display (for example, via a user interface element such as a preview pane, floating window, etc.) a selection of outcomes, each of which corresponds to a combination of the first object 430*a* with the second object 430*b*, the third object 430*c*, the fourth object 430*d*, the fifth object 430*e*, and the sixth object 430*f*, generated by the application of a spacing operation. As shown in the top row of FIG. 4B, the centers of each object are spaced one inch apart, which produces zero space with circles having one inch diameters, and 0.5 inch space with ovals having 0.5 inch diameters across their shorter axes. As shown in the center row of FIG. 4B, the space between each object is set to zero. In another non-limiting example, when an alignment outcome is selected from the display of outcomes, an alignment guide is temporarily displayed among the objects to indicate the alignment position that is being used. The alignment guide may be dismissed, for example, by the user or automatically by the system when a different action is taken by the user, after a time interval (e.g., 2 seconds), etc.

Referring to FIG. 4C, the user interface 400 may be generated after a user selects, in the currently displayed arrangement of objects 440*h*, a plurality of objects including (in this illustrative but non-limiting example) a first object (e.g. a circle as shown in the example of FIG. 4C), a second object (e.g. a square as shown in the example of FIG. 4C), and a third object (e.g. a triangle as shown in the example of FIG. 4C). The user interface 400 may be updated to display (for example, via a user interface element such as a preview pane, floating window, etc.) a selection of outcomes, each of which corresponds to a potential alignment configuration of the objects. For example, the user interface 400 can display as possible outcomes a left edge alignment as in 440*a*, a horizontal center align as in 440*b*, a right edge align as in 440*c*, a top edge align as in 440*d*, a vertical center align as in 440*e*, a bottom edge align as in 440*f*, and an all center align as in 440*g*.

As noted, the computer numerically controlled machine 100 may also effect, to the material 140, one or more changes corresponding to a three-dimensional treatment applied to one or more edges along a perimeter of the material 140. For example, the computer numerically controlled machine 100 may deliver, to the material 140, electromagnetic energy to create a variable depth engraving along at least a portion of the perimeter of the material 140 in order to create a chamfer (e.g., a sloped or angled edge) or a fillet (e.g., a rounded or smooth edge) along one or more edges of the material 140. In some example embodiments, the user interface (UI) associated with the computer numerically controlled machine 100 may be further configured to support the configuration of an edge treatment such as, for example, a chamfer, a fillet, and/or the like. For instance, the user may interact with the user interface in order to add, to the material 140, an edge treatment. Moreover, the user may interact with the user interface in order to configure the edge treatment including, for example, by modifying one or more characteristics of the edge treatment, selecting one of the variations of the edge treatment presented by the user interface, and/or the like.

Figure 5:
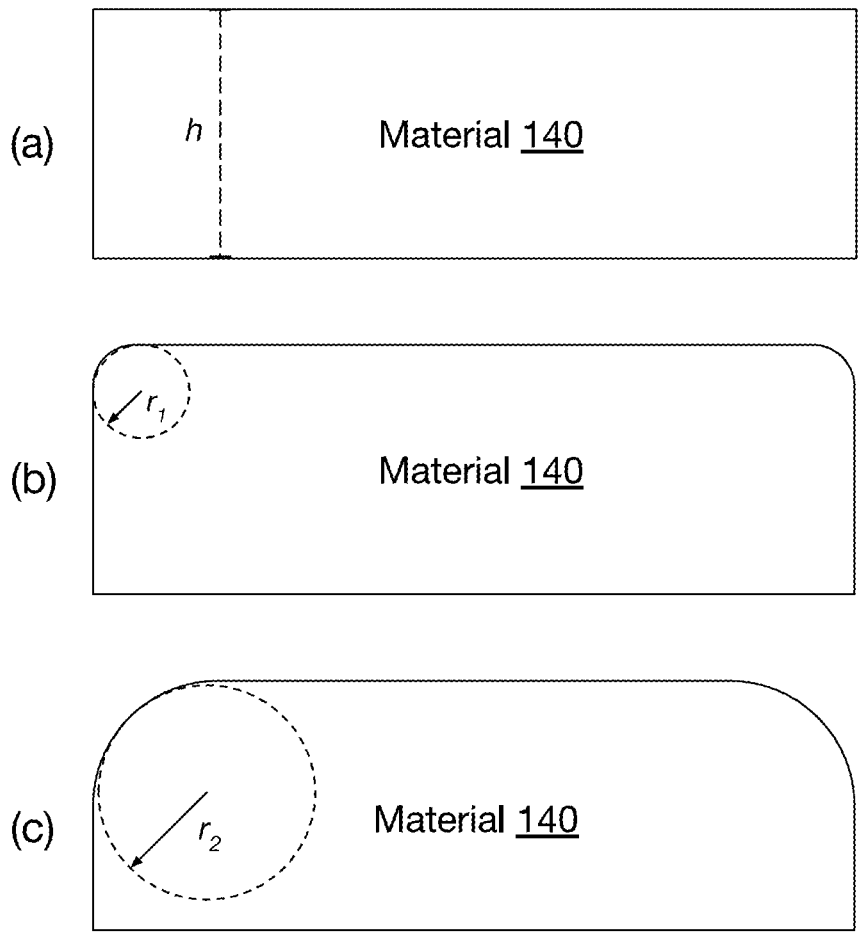
FIG. 5 depicts side cross sectional views of variations of an example of an edge treatment consistent with implementations of the current subject matter.

To further illustrate, FIG. 5 depicts cross sectional views of variations of a fillet that may be added to one or more edges along the perimeter of the material 140. The fillet may be a 3-dimensional edge treatment that is created by the computer numerically controlled machine 100 delivering, to the material 140, electromagnetic energy to create a variable depth engraving along at least a portion of the perimeter of the material 140. As shown in FIG. 5, the fillet may be a smoothing or rounding of the edge of the material 140 that may be characterized by a radius of the fillet. For example, FIG. 5(b) depicts a first variation of the fillet having a first radius $r_1$ while FIG. 5(c) depicts a second variation of the fillet having a second radius $r_2$.

Referring to FIG. 5(a), the radius of the fillet may be constrained, for example, by a height h of the material 140, the composition of the material 140, and/or due to the operational parameters of the CNC machine 100. Accordingly, the user interface associated with the computer numerically controlled machine 100 may be configured to prevent the user from configuring the fillet to have a radius exceeding a maximum radius $r_{max}$ that the material 140 having the height h is able to accommodate. For instance, the first radius $r_1$ of the first variation of the fillet shown in FIG. 5(b) and the second radius $r_2$ of the second variation of the fillet shown in FIG. 5(c) may not exceed the maximum radius $r_{max}$ that the material 140 having the height h is able to accommodate. The height h of the material 140 may be determined in a variety of ways. For example, the height h of the material 140 may be input by the user, indicated by a barcode (or another identifier) associated with the material 140 that may be automatically identified by the computer numerically controlled machine 100, or measured by the computer numerically controlled machine 100. Additionally, the user interface associated with the computer numerically controlled machine 100 may be configured to prevent the user from configuring the fillet to have a radius smaller than a minimum radius. This limitation may be due, for example, to the dimensions of the material 140, the composition or other properties of the material 140, and/or due to the operational parameters of the CNC machine 100. Accordingly, the user interface associated with the computer numerically controlled machine 100 may prevent the user from configuring a fillet having a radius exceeding the maximum radius or smaller than the minimum radius.

Additionally, the user interface associated with the CNC machine 100 may generate and display a cross-sectional view of the material 140 based on the material parameters, and the user may interact with the user interface to assign a fillet or chamfer to the material 140. The cross-sectional view of the material 140 may be based on the identification of the material and the associated properties of the material.

In some example embodiments, the user may interact with the user interface to configure the fillet to add to the material 140 by at least adjusting the radius of the fillet. For example, by interacting with the user interface associated with the computer numerically controlled machine 100, the user may generate the first variation of the fillet having the first radius $r_1$ or the second variation of the fillet having the second radius $r_2$. Alternatively and/or additionally, the fillet to add to the material 140 may be configured by the user selecting, for example, the first variation of the fillet having the first radius $r_1$ or the second variation of the fillet having the second radius $r_2$ presented by the user interface. Accordingly, the computer numerically controlled machine 100 may deliver, to the material 140, electromagnetic energy to create, along at least a portion of the perimeter of the material 140, a variable depth engraving corresponding to the first variation of the fillet having the first radius $r_1$ or the second variation of the fillet having the second radius $r_2$. Additionally, the user may interact with the user interface to configure the fillet to add to the material 140 by at least changing the shape of the fillet from a circle to an ellipse or other shape variations, or to select two points on the edges of the material 140 and creating a parabolic fillet to connect the points.

Alternatively and/or additionally, the computer numerically controlled machine 100 may be configured to deliver, to the material 140, electromagnetic energy to create a variable depth engraving along at least a portion of the perimeter of the material 140 in order to create a chamfer (e.g., a sloped or angled edge). Accordingly, the user interface associated with the computer numerically controlled machine 100 may be further configured to support the configuration of a chamfer. For example, the user may interact with the user interface in order to add a chamfer to one or more portions of a perimeter of the material 140. Furthermore, the user may interact with the graphical user interface to configure the chamfer including, for example, adjusting a height and/or an angle of the chamfer, selecting one of the variations of the chamfer presented by the user interface, and/or the like.

Figure 6:
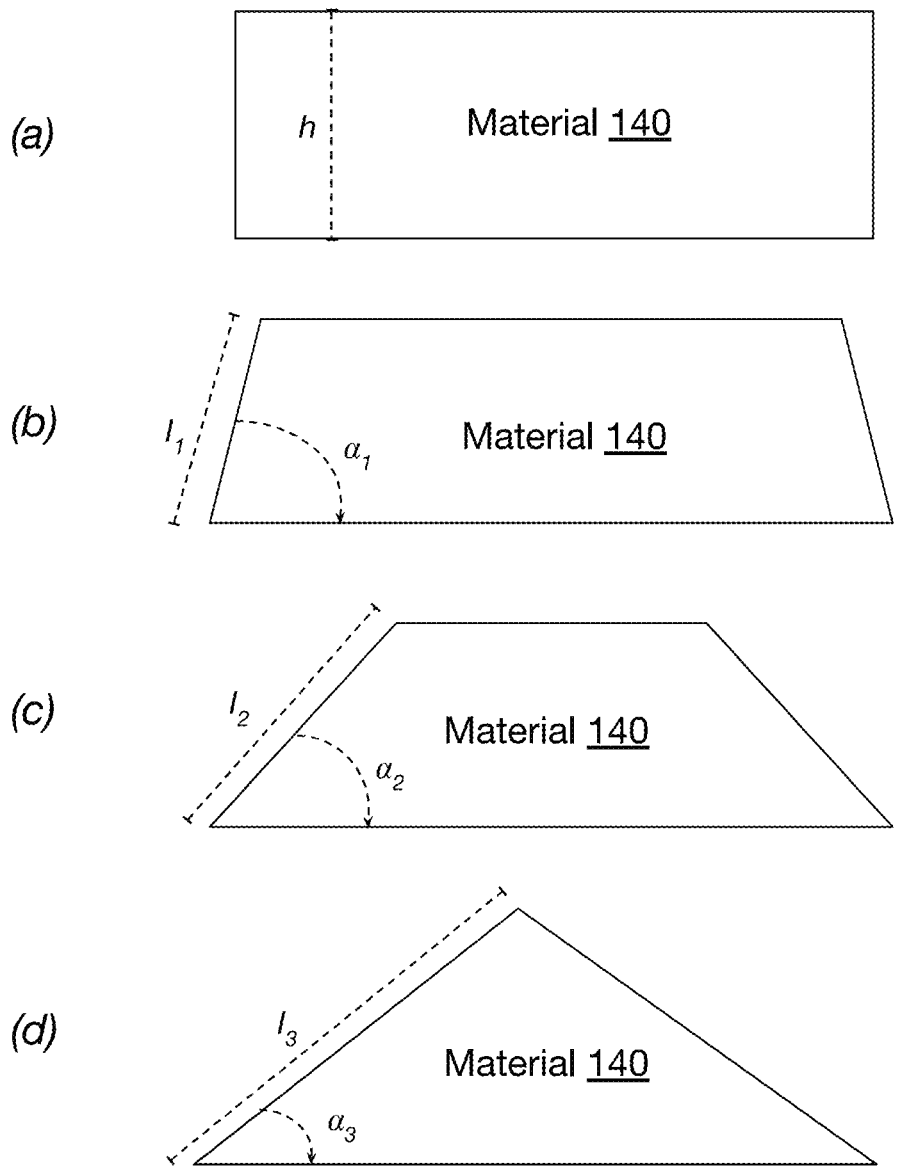
FIG. 6 depicts a side cross sectional views of variations of another example of an edge treatment consistent with implementations of the current subject matter.

FIG. 6 depicts cross-sectional views of variations of a chamfer that may be added to one or more edges along the perimeter of the material 140. In some example embodiments, the computer numerically controlled machine 100 may create a chamfer by at least delivering electromagnetic energy to create a variable depth engraving along at least a portion of the perimeter of the material 140. As shown in FIG. 6, the chamfer may be an angling or sloping of the edge of the material 140 characterized by a length and/or an angle of the chamfer. For example, FIG. 6(b) depicts a first variation of the chamfer having a first length $l_1$ and a first angle $\alpha_1$, FIG. 6(c) depicts a second variation of the chamfer having a second length $l_2$ and a second angle $\alpha_2$, and FIG. 6(d) depicts a third variation of the chamfer having a third length $l_3$ and a third angle $\alpha_3$.

As shown in FIG. 6(a), the length and angle of the chamfer added to the material 140 may be constrained by the height h of the material 140, which may be determined in a variety of manners including, for example, one or more of a user input, a barcode (or another identifier) associated with the material 140 that may be automatically identified by the computer numerically controlled machine 100, measurements performed by the computer numerically controlled machine 100, etc. The material 140 having the height h may be unable to accommodate a chamfer exceeding a maximum length $l_{max}$ and a minimum angle $\alpha_{min}$. This chamfer limitation may be due, for example, to the dimensions of the material 140, the composition or other properties of the material 140, and/or due to the operational parameters of the CNC machine 100. Accordingly, the user interface associated with the computer numerically controlled machine 100 may prevent the user from configuring a chamfer having a length exceeding the maximum length $l_{max}$ and/or an angle below the minimum angle $\alpha_{min}$. For example, the first length $l_1$ and the first angle $\alpha_1$ of the first variation of the chamfer shown in FIG. 6(b), the second length $l_2$ and the second angle $\alpha_2$ of the second variation of the chamfer shown in FIG. 6(c), and the third length $l_3$ and the third angle $\alpha_3$ of the third variation of the chamfer shown in FIG. 6(d) may not exceed the maximum length $l_{max}$ and the minimum angle $\alpha_{min}$ that the material 140 having the height h is able to accommodate.

In some example embodiments, the user may interact with the user interface associated with the computer numerically controlled machine 100 to configure the chamfer to add to the material 140 by at least adjusting the length and/or the angle of the chamfer. For example, the user may interact with the user interface to generate, for example, the first variation of the chamfer having the first length $l_1$ and the first angle $\alpha_1$, the second variation of the chamfer having the second length $l_2$ and the second angle $\alpha_2$, or the third variation of the chamfer having the third length $l_3$ and the third angle $\alpha_3$. Alternatively and/or additionally, the user interface associated with the computer numerically controlled machine 100 may display, for selection by the user, one or more variations of the chamfer that may be added to the material 140 including, for example, the first variation of the chamfer having the first length $l_1$ and the first angle $\alpha_1$, the second variation of the chamfer having the second length $l_2$ and the second angle $\alpha_2$, or the third variation of the chamfer having the third length $l_3$ and the third angle $\alpha_3$. The computer numerically controlled machine 100 may deliver, to the material 140, electromagnetic energy to create, along at least a portion of the perimeter of the material 140, a variable depth engraving corresponding to the variation of the chamfer configured by the user.

Figure 7:
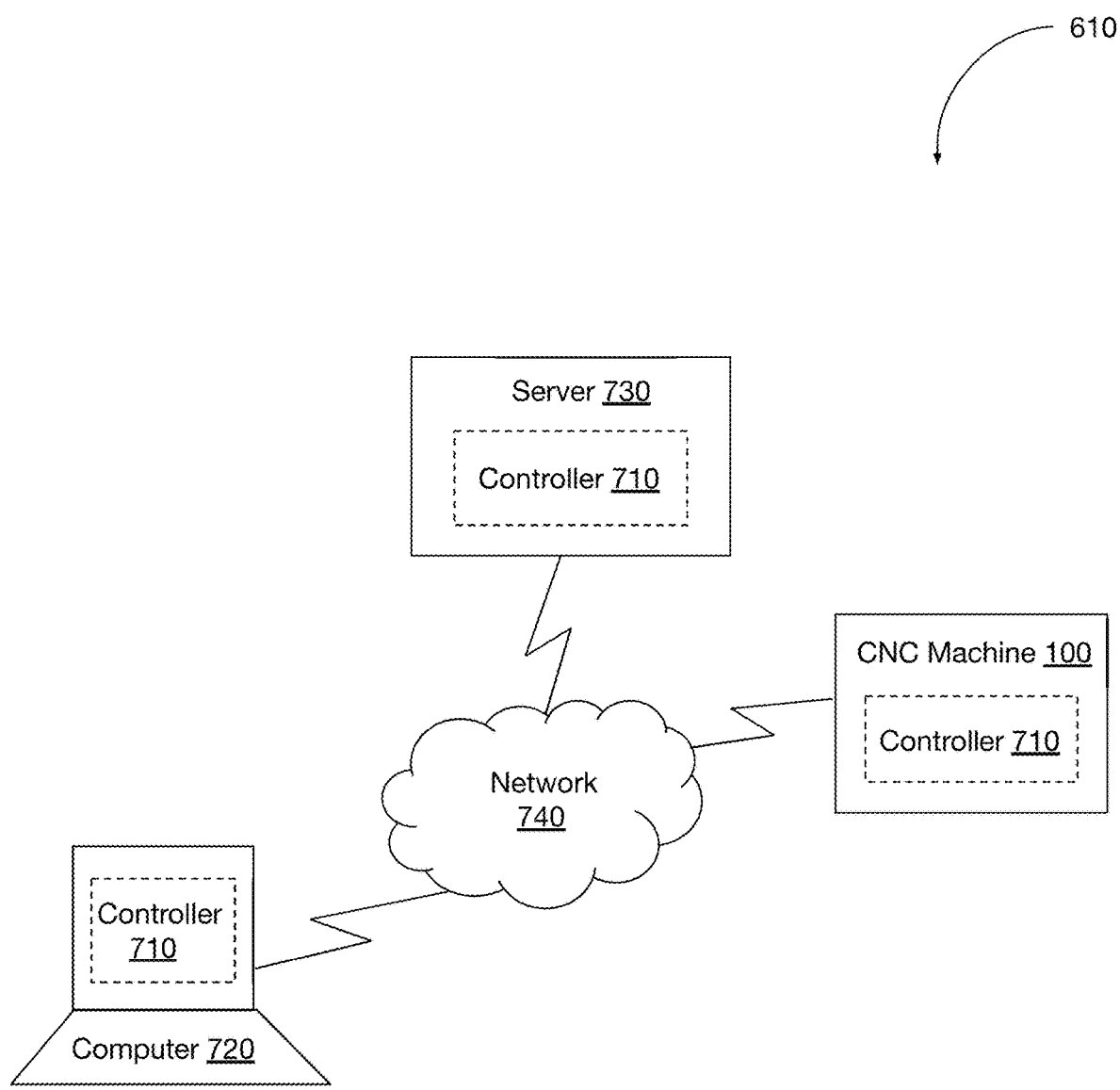
FIG. 7 depicts a system diagram illustrating an example of a computer numerically controlled processing system consistent with implementations of the current subject matter.

FIG. 7 depicts a block diagram illustrating an example of a computer numerically controlled processing system 700 consistent with implementations of the current subject matter. Referring to FIGS. 1-2, 3A-B, and 4-7, the computer numerically controlled processing system 700 may include the computer numerically controlled machine 100 and a controller 710. The controller and/or a remote machine in communication with the controller may implement a user interface providing one or more of the features discussed herein. As shown in FIG. 7, the controller 710 may be deployed locally at the computer numerically controlled machine 100. Alternatively and/or additionally, the controller 710 may be deployed remotely, for example, at a computer 720 and/or a server 730 communicatively coupled with the computer numerically controlled machine 100. For example, as shown in FIG. 7, the computer numerically controlled machine 100 may be communicatively coupled with the computer 720 and/or the server 730 via a network 740. The network 740 may be a wired network and/or a wireless network including, for example, a local area network (LAN), a virtual local area network (VLAN), a wide area network (WAN), a public land mobile network (PLMN), the Internet, and/or the like.

Figure 8A:
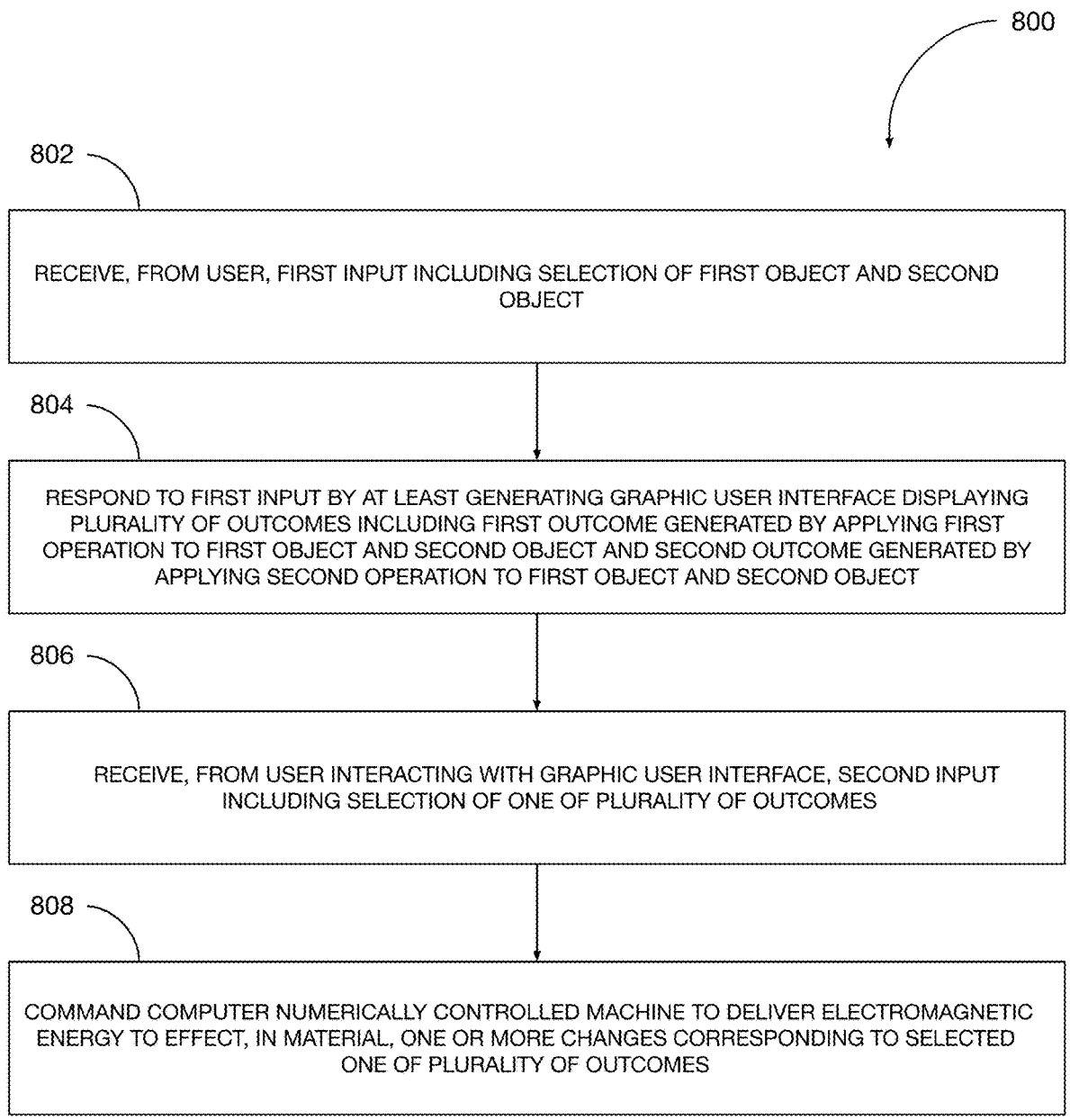
FIG. 8A depicts a flowchart illustrating an example of a process for configuring an edge treatment for computer numerically controlled fabrication consistent with implementations of the current subject matter.

FIG. 8A depicts a flowchart illustrating an example of a process 800 for configuring an operation (e.g., Boolean, alignment, spacing, etc.) consistent with implementations of the current subject matter. Referring to FIGS. 1-2, 3A-B, 4-7, and 8A, the process 800 may be performed by the controller 710 which, as noted, may be deployed locally at the computer numerically controlled machine 100 and/or remotely at the computer 720 and/or the server 730 communicatively coupled (e.g., via the network 740) with the computer numerically controlled machine 100.

At 802, the controller 710 may receive, from a user, a first input including a selection of a first object and a second object. For example, as shown in FIG. 4A, a user may provide an input selecting the first object 410a and the second object 410b. Although FIG. 4A shows the first object 410a as a square and the second object 410b as a circle, it should be appreciated that the first object 410a and the second object 410b may have any shape and/or form. The first object and the second object may be, for example, imported from a design file, imaged using a camera on the CNC machine 100, may be default objects in a computer program, may be created by the user, or may be originated by and received from another device or source.

At 804, after the first input is provided by the user the controller 710 may generate a user interface displaying a plurality of outcomes including a first outcome generated by applying a first operation to the first object and the second object and a second outcome generated by applying a second operation to the first object and the second object. For example, referring again to FIG. 4A, the controller 710 may respond to the user selecting the first object 410a and the second object 410b by generating the user interface 400. As shown in FIG. 4A, the user interface 400 may display a selection of outcomes, each of which corresponding to a combination of the first object 410a and the second object 410b generated by the application of a Boolean operation. For example, the user interface 400 may display the first outcome 420a corresponding to a union of the first object 410a and the second object 410b, the second outcome 420b corresponding to a subtraction of the second object 410b from the first object 410a, the third outcome 420c corresponding to an intersection of the first object 410a and the second object 410b, the fourth outcome 420d corresponding to a difference between the first object 410a and the second object 420b, and the fifth outcome 420e corresponding to a subtraction of the first object 410a from the second object 410b.

At 806, the controller 710 may receive, from the user interacting with the user interface, a second input including a selection of one of the plurality of outcomes. For example, the user may interact with the user interface 400 to select one of the first outcome 420a, the second outcome 420b, the third outcome 420c, the fourth outcome 420d, and the fifth outcome 420e. In some instances, the user may further interact with the user interface 400 to modify the selected outcome. For example, the user may adjust the positioning of the objects in the design, or change the dimension(s) of one or more objects in the design. Additionally and/or alternatively, other operations such as alignment operations, spacing operations, cut designations, or etch designations, may be applied to the design or to the objects in the design.

At 808, the controller 710 may command the computer numerically controlled machine 100 to deliver electromagnetic energy affecting, in the material 140, one or more changes corresponding to the selected one of the plurality of outcomes. In some example embodiments, the controller 710 may command the computer numerically controlled machine 100 to deliver electromagnetic energy to affect, in the material 140, one or more changes corresponding to one of the first outcome 420a, the second outcome 420b, the third outcome 420c, the fourth outcome 420d, and the fifth outcome 420e selected by the user via the user interface 400. For example, the one or more changes may include the removal of one or more portions of the material 140, which may be achieved by one or more cuts that partially and/or fully penetrates the material 140.

Figure 8B:
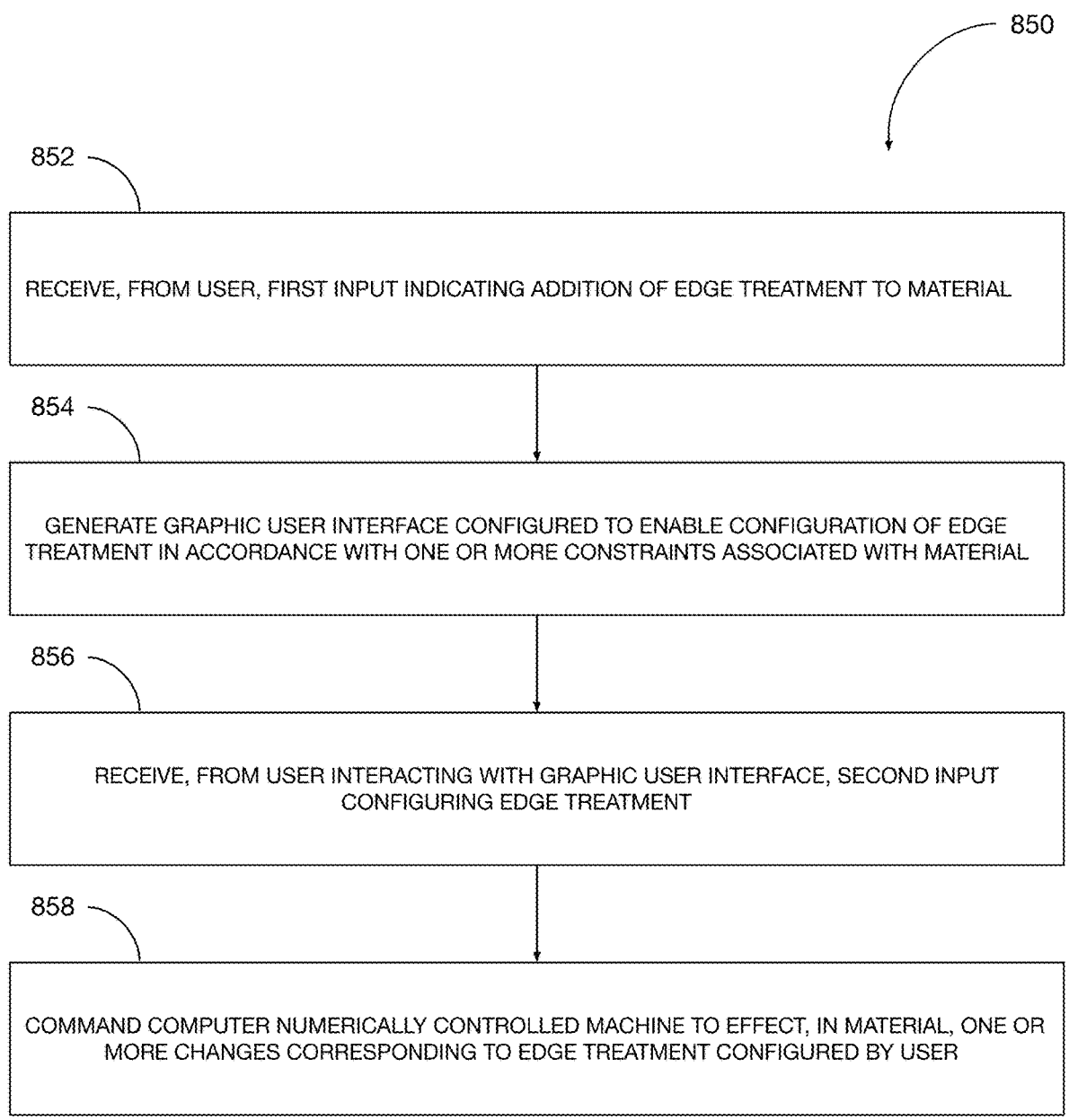
FIG. 8B depicts a flowchart illustrating an example of a process for configuring a Boolean operation for computer numerically controlled fabrication consistent with implementations of the current subject matter.

FIG. 8B depicts a flowchart illustrating an example of a process 850 for configuring an edge treatment consistent with implementations of the current subject matter. Referring to FIGS. 1-2, 3A-B, 4-7, and 8B, the process 850 may be performed by the controller 710 which, as noted, may be deployed locally at the computer numerically controlled machine 100 and/or remotely at the computer 720 and/or the server 730 communicatively coupled (e.g., via the network 740) with the computer numerically controlled machine 100.

At 852, the controller 710 may receive, from a user, a first input indicating an addition of an edge treatment to a material. For example, in some example embodiments, the user may provide an input indicating the addition of a fillet or a chamfer to one or more edges of the material 140. The fillet and the chamfer may be 3-dimensional edge treatments that are created by the computer numerically controlled machine 100 delivering, to the material 140, electromagnetic energy to create a variable depth engraving along at least a portion of the perimeter of the material 140.

At 854, the controller 710 may generate a user interface configured to enable a configuration of the edge treatment in accordance with one or more constraints associated with the material. In some example embodiments, the controller 710 may generate a user interface, for example, a graphical user interface (GUI), that enables the user to configure the edge treatment including, for example, by modifying one or more characteristics of the edge treatment, selecting a variation of the edge treatment presented by the graphical user interface, and/or the like. The configuration of the edge treatment may be constrained by one or more characteristics of the material 140 including, for example, a thickness, a height, a material composition, and/or the like. Additionally and/or alternatively, the configuration of the edge treatment may be constrained by one or more characteristics of the computer numerically controlled machine 100. Accordingly, the possible modifications to the edge treatment that may be accomplished via the user interface and/or the variations of the edge treatment presented in the user interface may be determined based at least on the one or more characteristics of the material 140 and/or the computer numerically controlled machine 100.

In some example embodiments, the controller 710 may generate the user interface to enable the configuration of a fillet, which may be a 3-dimensional edge treatment achieved by rounding and/or smoothing one or more edges of the material 140. The fillet may be configured by at least adjusting a radius of the fillet. Accordingly, the user interface may be configured to prevent the user from adjusting the radius of the fillet beyond the maximum radius that the material 140 is able to accommodate given the height (or thickness) of the material 140. For example, the user may interact with the user interface to specify a radius of the fillet to add to the material 140. Alternatively and/or additionally, the user interface may display one or more variations of the fillet, each of which having a different radius or shape, such that the user may configure the fillet by at least selecting one of the variations of the fillet presented by the user interface.

In some example embodiments, the controller 710 may generate the user interface to enable the configuration of a chamfer, which may be a 3-dimensional edge treatment achieved by angling or sloping one or more edges of the material 140. The fillet may be configured by at least adjusting a length or an angle of the chamfer. The user interface may therefore be configured to prevent the user from adjusting the length and/or the angle of the chamfer beyond the maximum length and/or the minimum angle that the material 140 is able to accommodate given the height (or thickness) of the material 140. To enable the configuration of the chamfer, the user interface may be configured to receive, from the user, one or more inputs specifying a length and/or an angle of the chamfer to add to the material 140. Alternatively and/or additionally, the user interface may display one or more variations of the chamfer, each of which having a different length and angle, such that the user may configure the chamfer by at least selecting one of the variations of the chamfer presented by the user interface.

At 856, the controller 710 may receive, from the user interacting with the user interface, a second input configuring the edge treatment. For example, the user may interact with the user interface to configure the first variation of the fillet having the first radius $r_1$ shown in FIG. 5(b) or the second variation of the fillet having the second radius $r_2$ shown in FIG. 5(c). Alternatively and/or additionally, the user may interact with the user interface to configure the first variation of the chamfer having the first length $l_1$ and the first angle $\alpha_1$ shown in FIG. 6(b), the second variation of the chamfer having the second length $l_2$ and the second angle $\alpha_2$ shown in FIG. 6(c), or the third variation of the chamfer having the third length $l_3$ and the third angle $\alpha_3$ shown in FIG. 6(d).

At 858, the controller 710 may command the computer numerically controlled machine 100 to deliver electromagnetic energy to effect, in the material, one or more changes corresponding to the edge treatment configured by the user. As noted, the fillet and the chamfer may be 3-dimensional edge treatments achieved by creating a variable depth engraving along at least a portion of the perimeter of the material 140. Accordingly, once the user has configured an edge treatment, for example, a fillet having a user-configured radius or a chamfer having a user-configured length and/or angle, the controller 710 may command the computer numerically controlled machine 100 to create, along at least a portion of the perimeter of the material 140, a variable depth engraving corresponding to the edge treatment.

Figure 9:
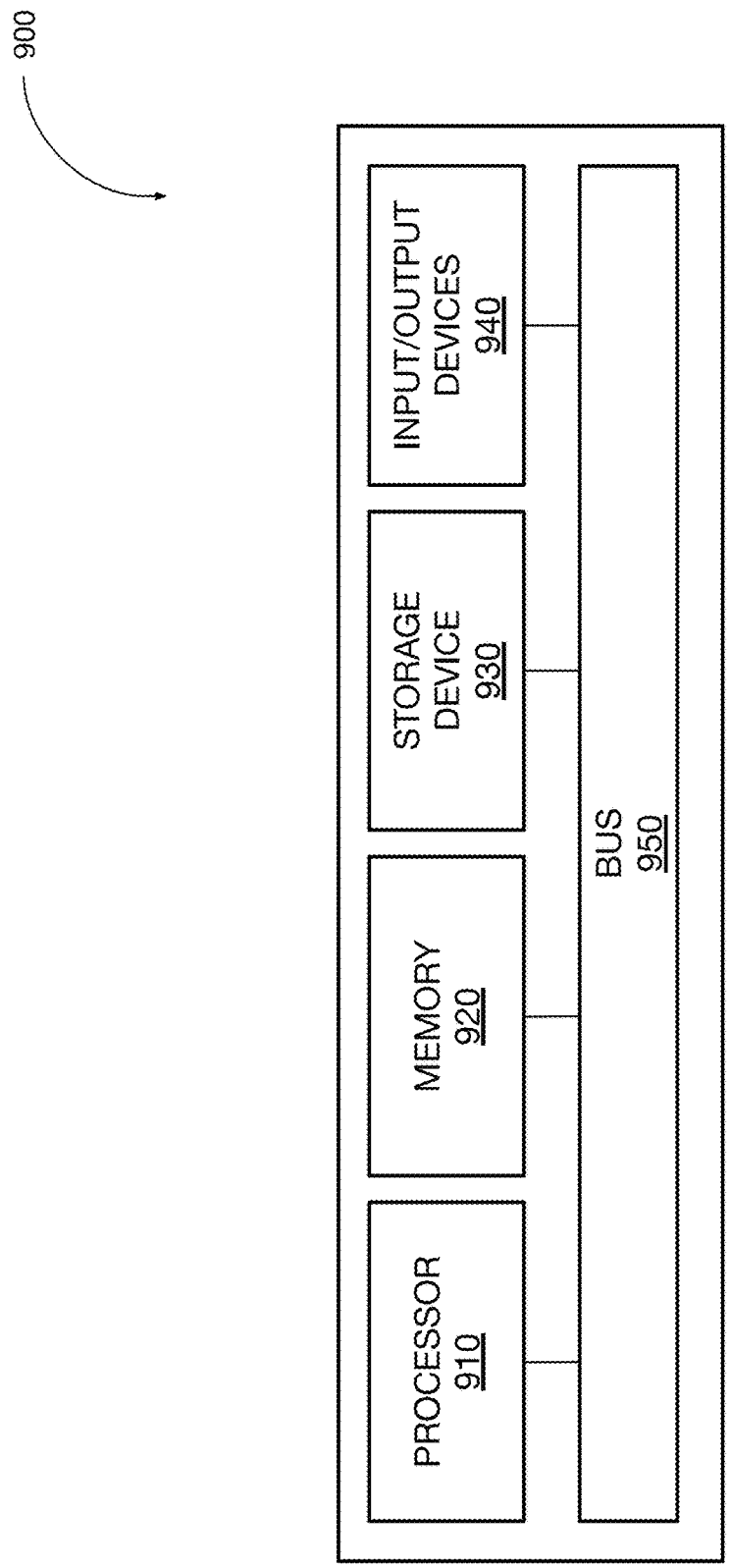
FIG. 9 depicts a block diagram illustrating a computing system consistent with implementations of the current subject matter.

FIG. 9 depicts a block diagram illustrating a computing system 900, consistent with implementations of the current subject matter. Referring to FIGS. 1-2, 3A-B, 4-7, 8A-B, and 9, the computing system 900 may implement the controller at the controller 710 and/or any components therein.

As shown in FIG. 9, the computing system 900 can include a processor 910, a memory 920, a storage device 930, and an input/output device 940. The processor 910, the memory 920, the storage device 930, and the input/output device 940 can be interconnected via a system bus 950. The processor 910 is capable of processing instructions for execution within the computing system 900. Such executed instructions can implement one or more components of, for example, the controller 710. In some implementations of the current subject matter, the processor 910 can be a single-threaded processor. Alternatively, the processor 910 can be a multi-threaded processor. The processor 910 is capable of processing instructions stored in the memory 920 and/or on the storage device 930 to control at least some of the operations of the computer numerically controlled machine 100.

The memory 920 is a computer readable medium such as volatile or non-volatile memory that stores information within the computing system 900. The memory 920 can store data structures representing configuration object databases, for example. The storage device 930 is capable of providing persistent storage for the computing system 900. The storage device 930 can be a solid state drive, a floppy disk device, a hard disk device, an optical disk device, or a tape device, or other suitable persistent storage means. The input/output device 940 provides input/output operations for the computing system 900. In some implementations of the current subject matter, the input/output device 940 can provide input/output operations for a network device. For example, the input/output device 940 can include Ethernet ports or other networking ports to communicate with one or more wired and/or wireless networks (e.g., a local area network (LAN), a wide area network (WAN), the Internet).

In some embodiments, an outline operation applied to two or more objects may be defined as a union of two or more objects plus an optional offset. The outcome of the outline created may be a new object that contains the history of the two or more objects selected for the outline. The default size of the resulting outcome for the outline operation may be different (i.e. smaller or larger) than the objects selected. For example, the default size of the outline may be 0.25 inches larger than the objects selected. In another example, the default size may be proportional to the size of the objects, may be a function of the resolution of the objects, or may be a function of the expected kerf of the objects given a specific material and design. In some embodiments, the outline operation may be a Boolean union of two or more objects plus a scale with shape modification. For example, shape modification may be a curvy shape, a linear shape, or any custom shape selected by or recommended to the user.

Figure 10A:
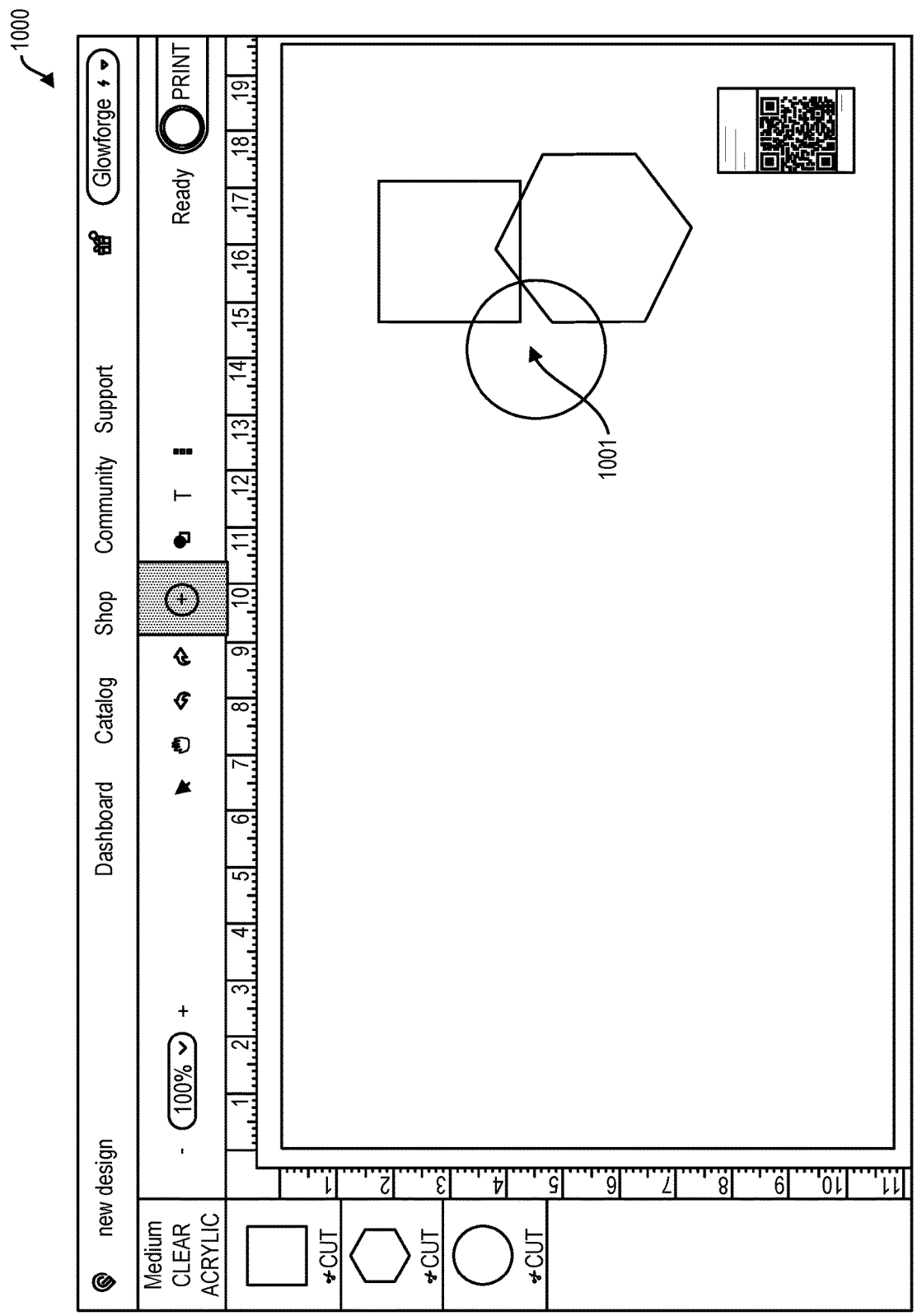
FIGS. 10A-10D depict an embodiment of a user interface consistent with implementations of the current subject matter.
Figure 10B:
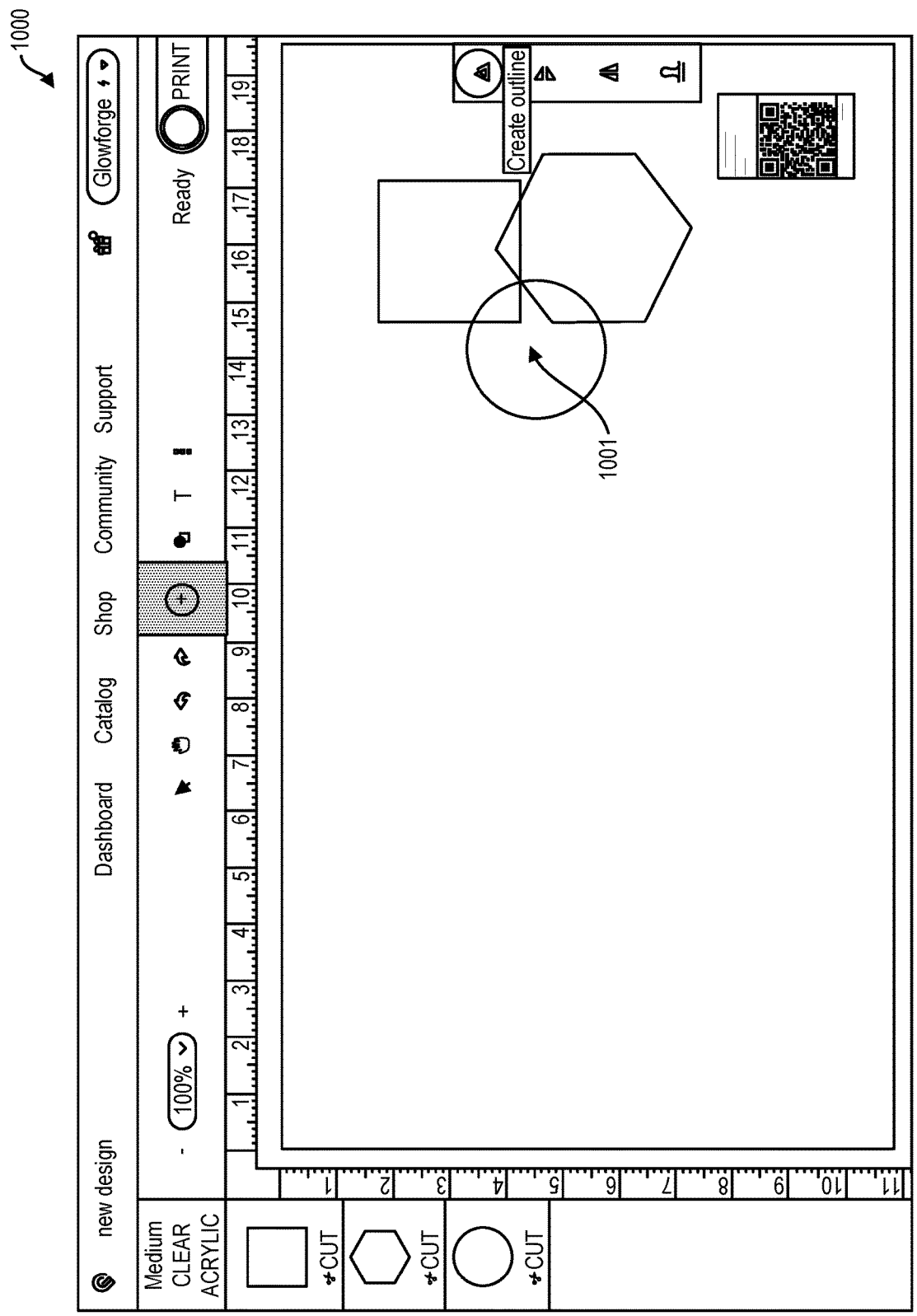
Figure 10C:
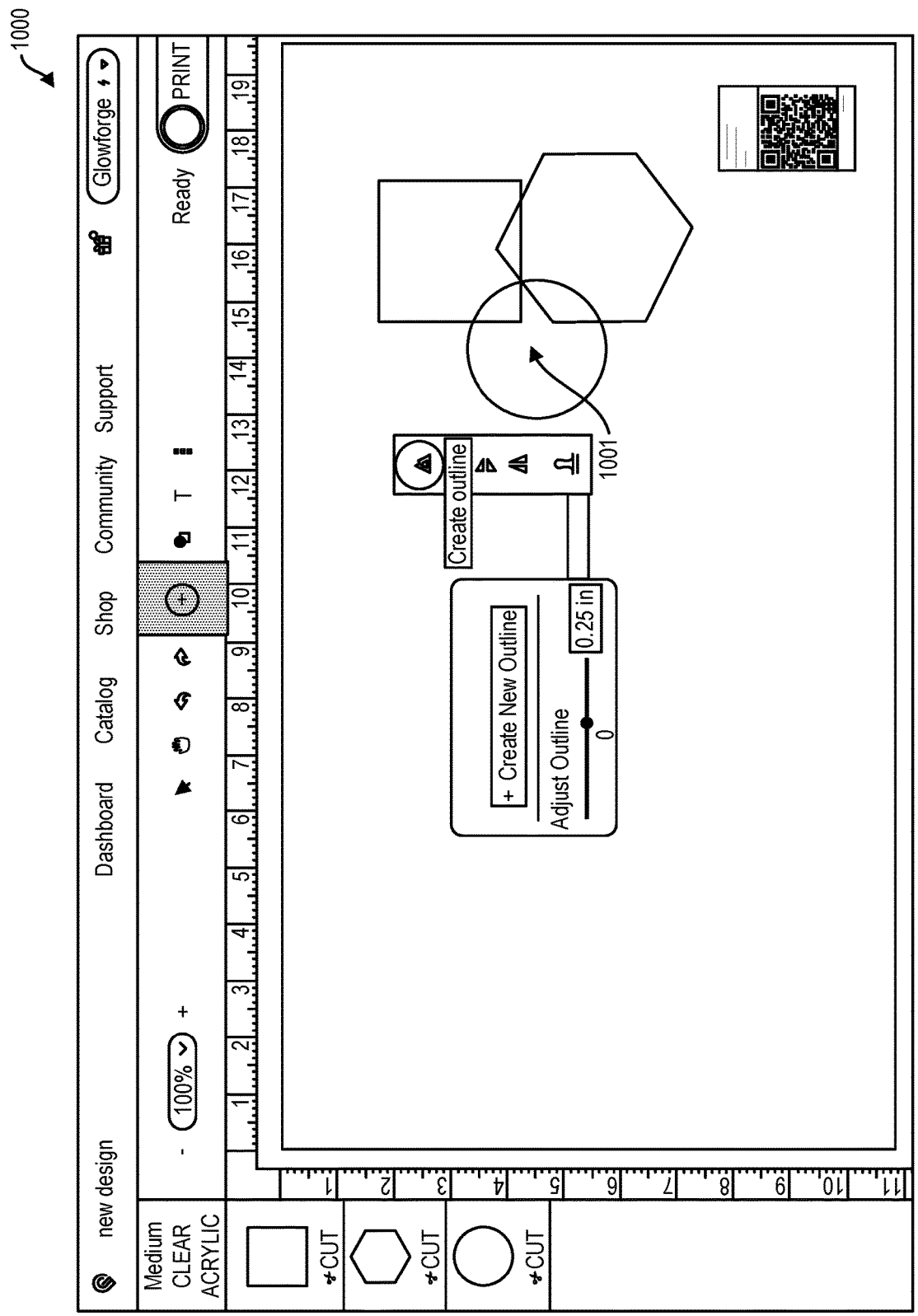
Figure 10D:
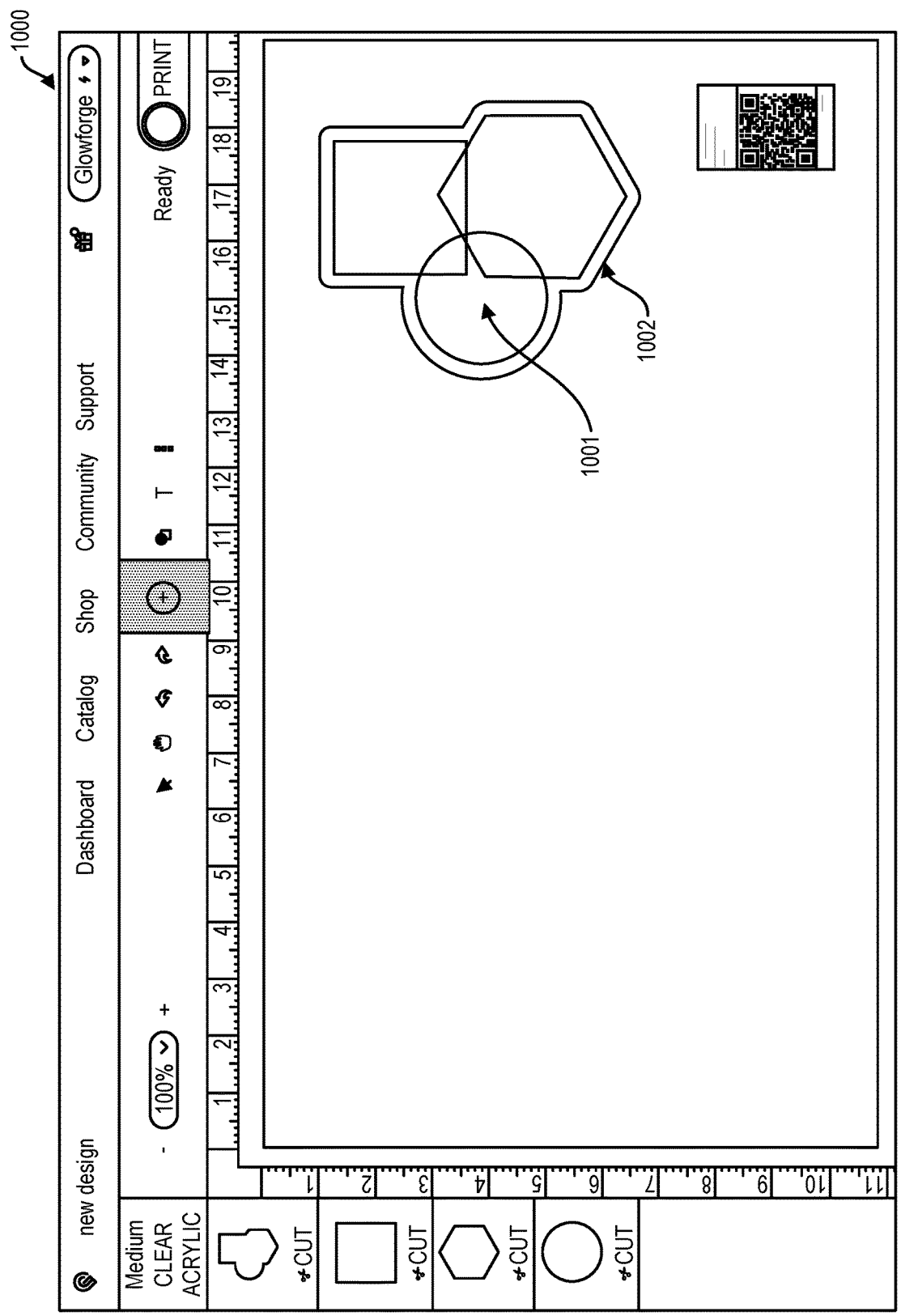

FIGS. 10A-10D illustrates the use of an outline operation in a graphic user interface (GUI) 1000. As shown in FIG. 10A, multiple objects 1001 are selected and combined in a desired configuration. In FIG. 10B, the GUI 1000 offers various options to the user including creation of an outline. In FIG. 10C, once the user has selected creation of an outline, the GUI 1000 offers additional functions to the user such as adjusting the offset width of the outline. As shown in FIG. 10D, an outline 1002 is created around the multiple objects 1001 and displayed on the GUI 1000.

In some embodiments, an auto-generated stamp maker functionality can be implemented. The stamp maker functionality can include the following operations. First, one or more objects are selected to create a design for the stamp. Once selected, the shape of the stamp can be defined (e.g. square, rectangle, circle, etc.) whereby the shape may be automatically determined based on the one or more objects selected to create the design for the stamp. These one or more objects may be selected by a user from a menu of options, and the like. Next, an image to be stamped is created based on the one or more objects that were selected, the image is reversed, and the reversed image is placed in the stamp shape. The details of the image or design to be stamped are not removed, so that they will appear as the stamp, and the excess material of the pad is removed. Then, a stamp handle may be added to the design, which may be sized automatically to match the stamp. The stamp handle is created to match the size of the stamp image or stamp image outline with minimum/maximum size constraints, to make the stamp handle useful for use by a person.

Figure 11A:
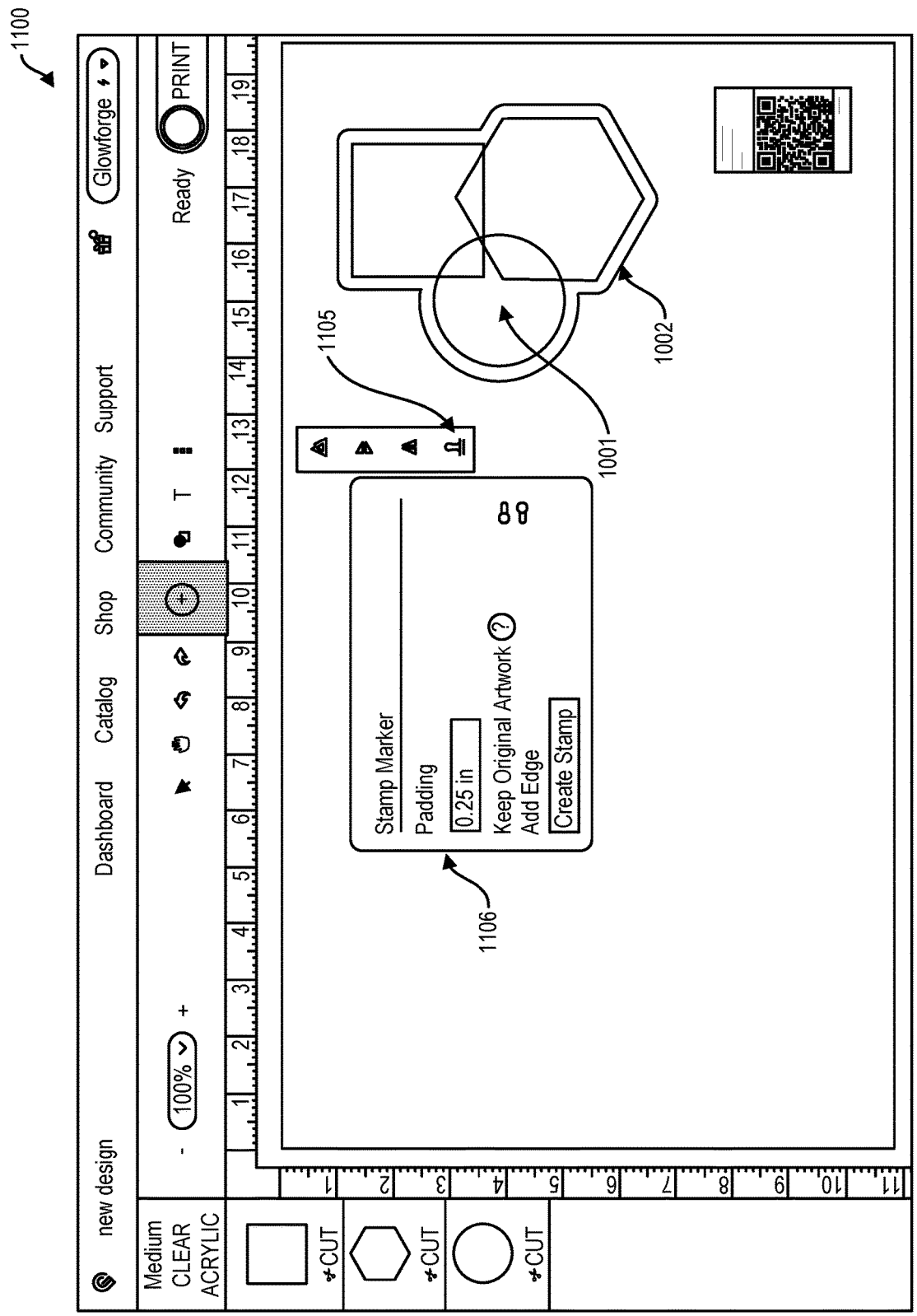
FIGS. 11A-11C depict another embodiment of a user interface consistent with implementations of the current subject matter.
Figure 11B:
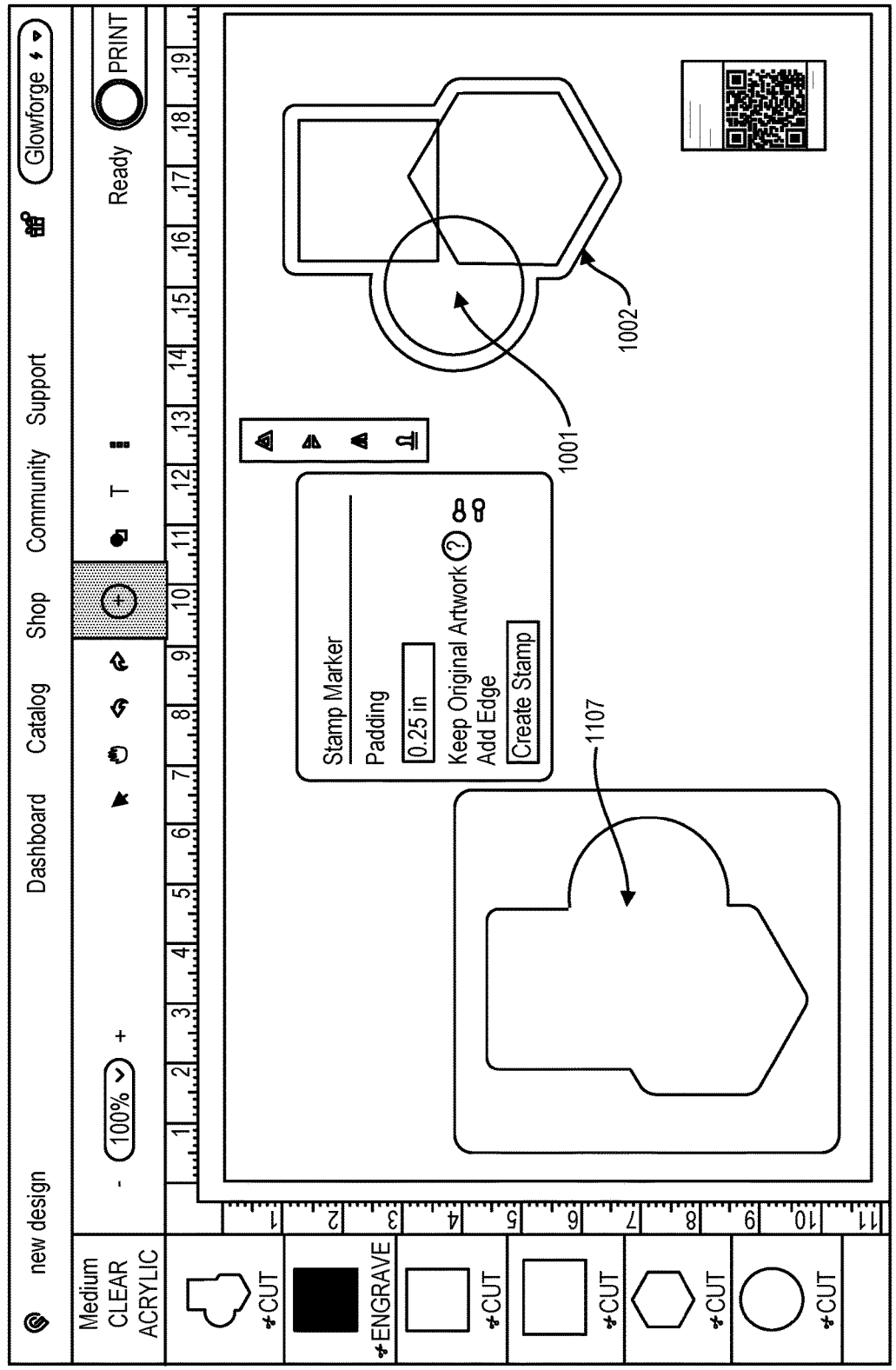
Figure 11C:
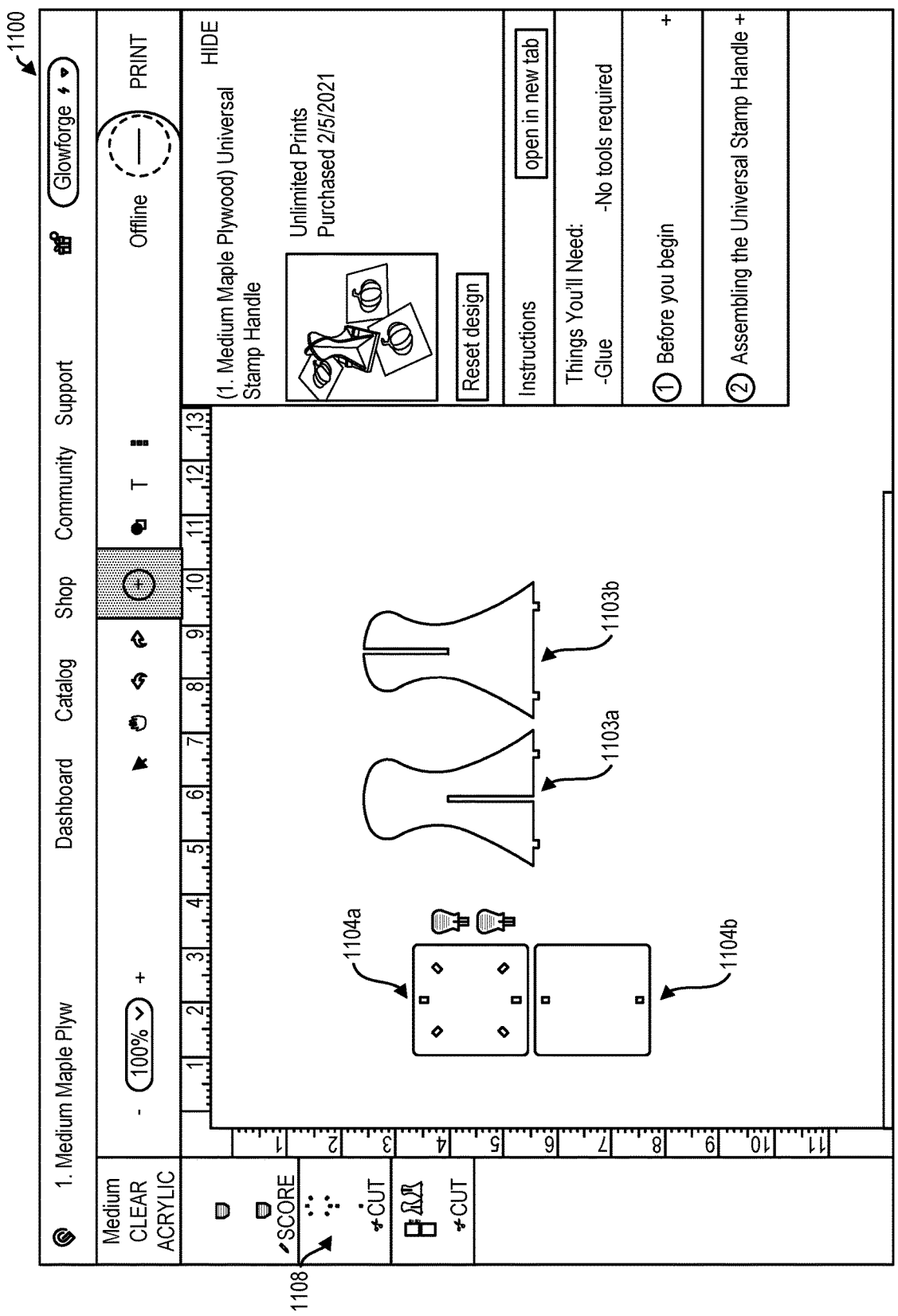

FIGS. 11A-11C illustrate the use of a stamp maker functionality in a GUI 1100. In an example implementation of this aspect of the current disclosure, a user has created an outline object 1002 and three individual objects 1001, for example an in FIGS. 10A-10D described above. The user then selects, for example via a user interface element 1105, a stamp maker functionality and is presented with information/functionality 1106 for making the stamp. This information/functionality 1106 includes, for example, padding, keep original artwork, and add edge options. As shown in FIG. 11A, an outline 1002 created using multiple objects 1001 is displayed on the GUI 1100. The GUI 1100 offers the user an option to use stamp maker functionality.

FIG. 11B shows the stamp 1107 as made by the selection of the user interface element for using the stamp maker functionality 1105 in FIG. 11A when selecting the outline object 1002. As can be seen in FIG. 11B, the stamp 1107 includes the reversed image of the outline object 1002. In this example, the outline object 1002 was the only object selected for the stamp. In FIG. 11B, the stamp 1107 is separated from the outline object 1002 and displayed as a new object by the GUI 1100. In FIG. 11C, the GUI 1100 displays the stamp handle components 1103a, 1103b, 1104a, and 1104b. Additional instructions and information can be displayed by the GUI 1100. Consistent with features that can be included in an implementation of the current subject matter, the stamp handle design is automatically placed on a material, and includes "cut" and "score" functionality for each piece 1108. It is a completed design that will work with the stamp that was defined in the previous step. Pieces 1104a and 1104b are designed to match the shape of the stamp. In an alternate embodiment, pieces 1104a and 1104b may be implemented directly on the stamp 1107.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method carried out by a computing device, comprising:
    displaying, via a graphical user interface (GUI), (i) a visual representation of a first object, wherein a CNC machine is configured to deliver electromagnetic energy to effect, in a material, one or more changes corresponding to the first object and (ii) a visual representation of a second object, wherein the CNC machine is configured to deliver electromagnetic energy to effect, in the material, one or more changes corresponding to the second object;
    receiving first user input selecting (i) the visual representation of the first object and (ii) the visual representation of the second object;
    based on receiving the first user input, displaying, via the GUI, a visual representation of a set of outcomes, wherein each outcome in the set of outcomes includes elements of (i) the first object and (ii) the second object organized according to a respective type of combination of the first object and the second object;
    receiving second user input selecting a visual representation for a given outcome of the set of outcomes; and
    based on the second user input, causing the CNC machine to deliver electromagnetic energy to the material and thereby effect one or more changes in the material corresponding to the selected visual representation of the given outcome.

2. The computer-implemented method of claim 1, wherein the set of outcomes excludes outcomes that include elements of (i) the first object and (ii) the second object organized according to physically impossible types of combinations of the first object and the second object.

3. The computer-implemented method of claim 1, wherein respective types of combinations of the first object and the second object comprise: a union of the first object and the second object, a difference between the first object and the second object, a subtraction between the first object and the second object, or an intersection of the first object and the second object, or any combination thereof.

4. The computer-implemented method of claim 1, wherein respective types of combinations of the first object and the second object comprise alignment operations for the first object and the second object comprising one or more of: (i) align left, (ii) align horizontal centers, (iii) align right, (iv) align top, (v) align vertical centers, (vi) align bottom, (vii) align centers, (viii) space centers equally, or (ix) space equally between perimeters.

5. The computer-implemented method of claim 1, further comprising displaying, via the GUI, a respective label for each outcome in the set of outcomes describing the respective type of combination of the first object and the second object.

6. The computer-implemented method of claim 1, wherein displaying, via the GUI, the visual representation of the set of outcomes comprises positioning outcomes in the set of outcomes within the GUI based on the respective type of combination of the first object and the second object.

7. The computer-implemented method of claim 1, further comprising:
    receiving third user input modifying (i) the first object, (ii) the second object, or both; and
    based on the third user input, modifying the set of outcomes.

8. The computer-implemented method of claim 1, wherein causing the CNC machine to deliver electromagnetic energy to the material and thereby effect the one or more changes in the material corresponding to the selected visual representation of the given outcome comprises: commanding a head of the CNC machine to deliver electromagnetic energy to the material and thereby effect the one or more changes in the material corresponding to the selected visual representation of the given outcome.

9. The computer-implemented method of claim 1, wherein the first user input and the second user input are received via the GUI.

10. A system comprising:
at least one processor;
non-transitory computer-readable medium; and
program instructions stored on the non-transitory computer-readable medium that are executable by the at least one processor such that a computing device is configured to:
 display, via a graphical user interface (GUI), (i) a visual representation of a first object, wherein a CNC machine is configured to deliver electromagnetic energy to effect, in a material, one or more changes corresponding to the first object and (ii) a visual representation of a second object, wherein the CNC machine is configured to deliver electromagnetic energy to effect, in the material, one or more changes corresponding to the second object;
 receive first user input selecting (i) the visual representation of the first object and (ii) the visual representation of the second object;
 based on receiving the first user input, display, via the GUI, a visual representation of a set of outcomes, wherein each outcome in the set of outcomes includes elements of (i) the first object and (ii) the second object organized according to a respective type of combination of the first object and the second object;
 receive second user input selecting a visual representation for a given outcome of the set of outcomes; and
 based on the second user input, cause the CNC machine to deliver electromagnetic energy to the material and thereby effect one or more changes in the material corresponding to the selected visual representation of the given outcome.

11. The system of claim 10, further comprising the CNC machine.

12. The system of claim 10, wherein the set of outcomes excludes outcomes that include elements of (i) the first object and (ii) the second object organized according to physically impossible types of combinations of the first object and the second object.

13. The system of claim 10, wherein respective types of combinations of the first object and the second object comprise: a union of the first object and the second object, a difference between the first object and the second object, a subtraction between the first object and the second object, or an intersection of the first object and the second object, or any combination thereof.

14. The system of claim 10, wherein respective types of combinations of the first object and the second object comprise alignment operations for the first object and the second object comprising one or more of: (i) align left, (ii) align horizontal centers, (iii) align right, (iv) align top, (v) align vertical centers, (vi) align bottom, (vii) align centers, (viii) space centers equally, or (ix) space equally between perimeters.

15. The system of claim 10, further comprising program instructions stored on the non-transitory computer-readable medium that are executable by the at least one processor such that the computing device is configured to:
 receive third user input modifying (i) the first object, (ii) the second object, or both; and
 based on the third user input, modify the set of outcomes.

16. The system of claim 10, wherein the program instructions that are executable by the at least one processor such that the computing device is configured to deliver electromagnetic energy to the material and thereby effect the one or more changes in the material corresponding to the selected visual representation of the given outcome comprise program instructions that are executable by the at least one processor such that the computing device is configured to command a head of the CNC machine to deliver electromagnetic energy to the material and thereby effect the one or more changes in the material corresponding to the selected visual representation of the given outcome.

17. The system of claim 10, wherein:
the program instructions that are executable by the at least one processor such that the computing device is configured to receive the first user input comprise program instructions that are executable by the at least one processor such that the computing device is configured to receive the first user input via the GUI; and
wherein the program instructions that are executable by the at least one processor such that the computing device is configured to receive the second user input comprise program instructions that are executable by the at least one processor such that the computing device is configured to receive the second user input via the GUI.

18. A non-transitory computer-readable medium, wherein the non-transitory computer-readable medium is provisioned with program instructions that, when executed by at least one processor, cause a computing device to:
 display, via a graphical user interface (GUI), (i) a visual representation of a first object, wherein a CNC machine is configured to deliver electromagnetic energy to effect, in a material, one or more changes corresponding to the first object and (ii) a visual representation of a second object, wherein the CNC machine is configured to deliver electromagnetic energy to effect, in the material, one or more changes corresponding to the second object;
 receive first user input selecting (i) the visual representation of the first object and (ii) the visual representation of the second object;
 based on receiving the first user input, display, via the GUI, a visual representation of a set of outcomes, wherein each outcome in the set of outcomes includes elements of (i) the first object and (ii) the second object organized according to a respective type of combination of the first object and the second object;
 receive second user input selecting a visual representation for a given outcome of the set of outcomes; and
 based on the second user input, cause the CNC machine to deliver electromagnetic energy to the material and thereby effect one or more changes in the material corresponding to the selected visual representation of the given outcome.

19. The non-transitory computer-readable medium of claim 18, wherein the set of outcomes excludes outcomes that include elements of (i) the first object and (ii) the second object organized according to physically impossible types of combinations of the first object and the second object.

20. The non-transitory computer-readable medium of claim 18, wherein the non-transitory computer-readable medium is also provisioned with program instructions that, when executed by at least one processor, cause the computing device to:

receive third user input modifying (i) the first object, (ii) the second object, or both; and based on the third user input, modify the set of outcomes.

\* \* \* \* \*